United States Patent [19]
Porter et al.

[11] Patent Number: 6,154,527
[45] Date of Patent: *Nov. 28, 2000

[54] INTERACTIVE VOICE RESPONSE SYSTEM

[75] Inventors: Donna Porter, Tuckahoe; Lawrence D. Weiss, Skaneateles, both of N.Y.

[73] Assignee: Citibank, N.A., New York, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/173,751

[22] Filed: Oct. 16, 1998

Related U.S. Application Data

[63] Continuation of application No. 08/618,723, Mar. 20, 1996, Pat. No. 5,825,856, which is a continuation of application No. 08/322,619, Oct. 13, 1994, abandoned, which is a continuation-in-part of application No. 08/220,863, Mar. 31, 1994, abandoned.

[51] Int. Cl.⁷ ...................................................... H04M 1/66
[52] U.S. Cl. ...................................... 379/88.18; 379/93.12
[58] Field of Search ................................ 379/67.1, 88.01, 379/88.04, 88.05, 88.06, 88.16, 88.17, 88.18, 88.19, 88.22, 88.24, 90.01, 91.01, 93.02, 93.03, 93.05, 93.12; 364/401, 406, 408; 395/240, 242; 902/24, 26

[56] References Cited

U.S. PATENT DOCUMENTS

| | | | |
|---|---|---|---|
| 4,591,664 | 5/1986 | Freeman | 379/373 |
| 4,727,243 | 2/1988 | Savar | 235/379 |
| 4,792,968 | 12/1988 | Katz | 379/92 |
| 4,845,739 | 7/1989 | Katz | 379/92 |
| 4,930,150 | 5/1990 | Katz | 379/93 |
| 4,932,046 | 6/1990 | Katz et al. | 379/32 |
| 4,935,956 | 6/1990 | Hellworth et al. | 379/112 |
| 4,939,773 | 7/1990 | Katz | 379/204 |
| 4,979,206 | 12/1990 | Padden et al. | 379/67 |

(List continued on next page.)

FOREIGN PATENT DOCUMENTS

WO 93/04435  3/1993  WIPO .............................. 379/91.01

OTHER PUBLICATIONS

Perdue et al., "Conversant 1 Voice System: Architecture and Applications", AT&T Technical Journal, Sept./Oct. 1986, vol. 65, No.5, pp. 34–37.

Robins, "Voice Mail/Cell Processing Product Roundup", Teleconnect Magazine, Apr. 1988, pp. 87–89, 101–106, 108–111, 113–114, 116–121.

Heller, "Dialing up Debtors", Inbound/Outbound Magazine. Sep. 1989, pp. 22–26.

Ives, "How to Teach your Computer to Take Orders", Inbound/Outbound Magazine, Sep. 1989, pp. 36–40.

Ives, "Information and Orders of the Touch of a Tone", Inbound/Outbound Magazine, Sep. 1989, 00. pp.42–47.

Introducing VMXworks™, Powerful Applications Developments Tools for VMX System, VMX, Inc., Apr. 1990.

Wootenberger et al., "Serving Customers with Automatic Spoeech Recognition—Human Factors Issues", AT&T Technical Journal, May/Jun. 1993, pp. 28–41.

"Automatic Dual Tone Modulation Deletion of E–Mail Messages", IBM Technical Disclosure Bulleting, vol. 36, No. 09B, Sept. 1993, pp. 461–462.

Reportee© Training Guide, version 6.0, Active Voice Corp., Copyright 1988–1990, pp. 1–10.

*Primary Examiner*—Scott L. Weaver
*Attorney, Agent, or Firm*—George T. Marcou; Kilpatrick Stockton LLP

[57] ABSTRACT

An interactive voice response system provides voice prompts that supply information to a user, request data from the user, and present the user with a plurality of selectable options. The user can first select one or more options by providing one or more letters of the alphabet corresponding to one or more of the selectable options. If the letter or letters that are provided correspond to more than one selectable option, the user further selects one of the options from among the selectable options corresponding to the one or more letters.

22 Claims, 29 Drawing Sheets

U.S. PATENT DOCUMENTS

| | | | |
|---|---|---|---|
| 4,987,590 | 1/1991 | Katz | 379/204 |
| 5,014,298 | 5/1991 | Katz | 379/93 |
| 5,016,270 | 5/1991 | Katz | 379/93 |
| 5,023,904 | 6/1991 | Kaplan et al. | 379/91 |
| 5,048,075 | 9/1991 | Katz | 379/92 |
| 5,073,929 | 12/1991 | Katz | 379/93 |
| 5,091,933 | 2/1992 | Katz | 379/204 |
| 5,109,404 | 4/1992 | Katz et al. | 379/88 |
| 5,113,430 | 5/1992 | Richardson, Jr., et al. | 379/88 |
| 5,128,984 | 7/1992 | Katz | 379/92 |
| 5,138,549 | 8/1992 | Bern | 364/408 |
| 5,164,981 | 11/1992 | Mitchell et al. | 379/88 |
| 5,185,787 | 2/1993 | Katz | 379/204 |
| 5,187,735 | 2/1993 | Garcia | 379/88 |
| 5,204,894 | 4/1993 | Darden | 379/88 |
| 5,218,631 | 6/1993 | Katz | 379/88 |
| 5,224,153 | 6/1993 | Katz | 379/93 |
| 5,243,643 | 9/1993 | Sattar et al. | 379/88 |
| 5,247,568 | 9/1993 | Bergsman et al. | 379/67 |
| 5,251,252 | 10/1993 | Katz | 379/92 |
| 5,255,309 | 10/1993 | Katz | 379/88 |
| 5,259,023 | 11/1993 | Katz | 379/88 |
| 5,278,897 | 1/1994 | Mowery et al. | 379/212 |
| 5,283,829 | 2/1994 | Anderson | 379/91 X |
| 5,297,197 | 3/1994 | Katz | 379/204 |
| 5,329,589 | 7/1994 | Fraser et al. | 379/91 |
| 5,337,347 | 8/1994 | Halstead-Nussloch et al. | 379/67 |
| 5,345,501 | 9/1994 | Shelton | 379/89 |
| 5,349,633 | 9/1994 | Katz | 379/88 |
| 5,351,285 | 9/1994 | Katz | 379/94 |
| 5,359,645 | 10/1994 | Katz | 379/93 |
| 5,365,575 | 11/1994 | Katz | 379/92 |
| 5,375,164 | 12/1994 | Jennings | 379/88 |
| 5,383,113 | 1/1995 | Kight et al. | 364/401 |
| 5,553,120 | 9/1996 | Katz | 379/88 |
| 5,561,707 | 10/1996 | Katz | 379/88 |
| 5,652,786 | 7/1997 | Rogers | 379/91.01 |
| 5,684,863 | 11/1997 | Katz | 379/88 |

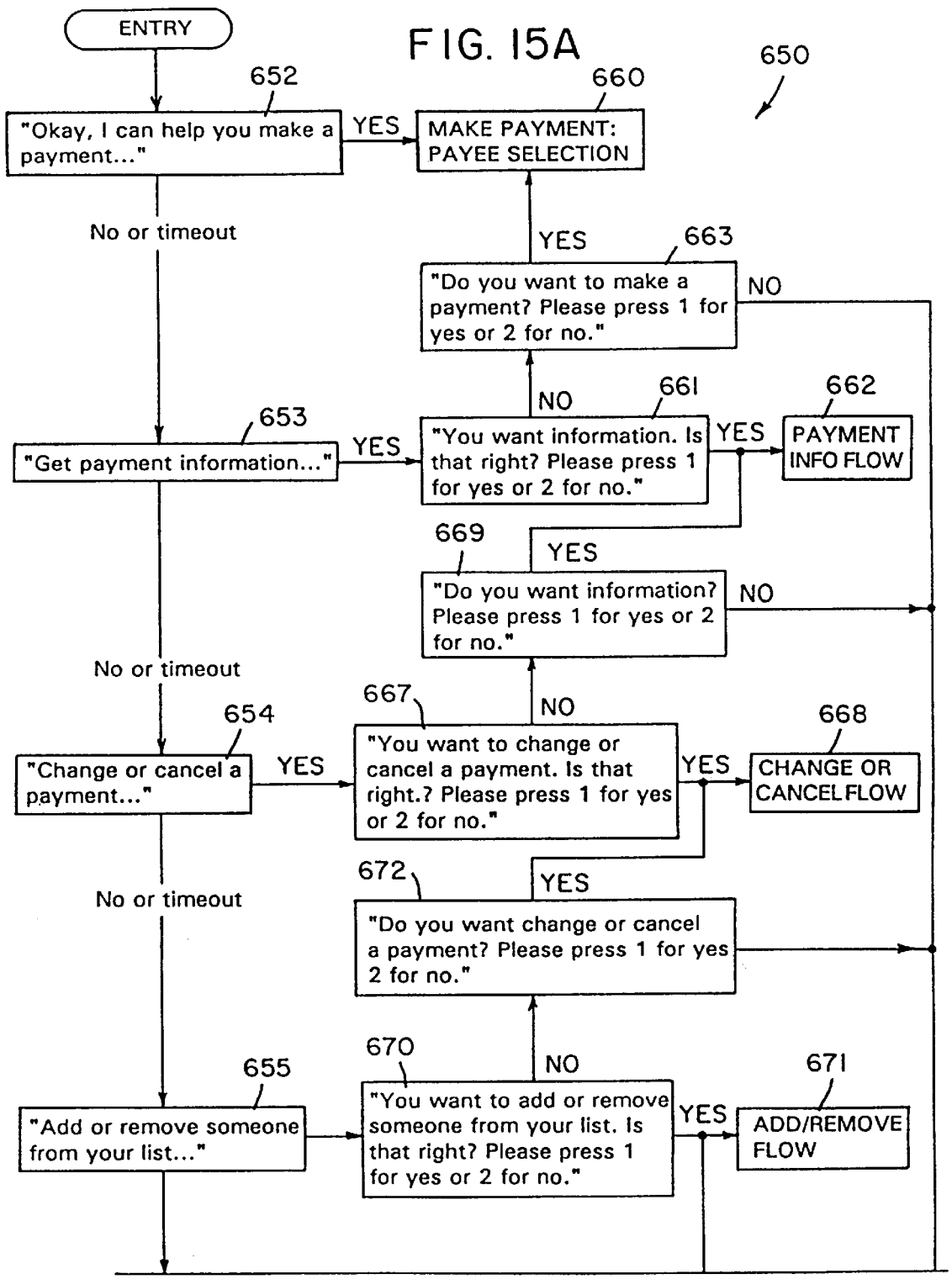

INTERACTIVE VOICE RESPONSE SYSTEM

This application is a Continuation of U.S. patent application Ser. No. 08/618,723 filed Mar. 20, 1996, now U.S. Pat. No. 5,825,856 which is a Continuation of U.S. patent application Ser. No. 08/322,619 filed Oct. 13, 1994, which is now abandoned, which is a Continuation-In-Part of U.S. patent application Ser. No. 08/220,863 filed Mar. 31, 1994, which is now abandoned.

FIELD OF THE INVENTION

This invention relates to the field of navigable voice systems accessible to a user via a conventional telephone connection using a touch-tone telephone.

BACKGROUND OF THE INVENTION

It is known to employ an automated system that provides voice messages to a user over a telephone line and processes the user's touch-tone telephone key presses as input. The messages can be tape recorded human voice messages or machine generated speech. The user can access the system by dialing a specific telephone number. The system automatically answers the telephone call and begins interacting with the user.

The messages from the system can provide the user with information or can prompt the user to enter data or to make a selection from a variety of choices. For example, a message can state: "For choice A, press one; For choice B, press two; For choice C, press three . . . ". If the number of choices is large, it may be necessary to present the choices in more than one menu. In that case, the final part of the message would prompt the user to provide a particular input in order to receive an additional message that lists other choices (e.g. "Press nine to hear more options"). The user navigates through the system by providing appropriate input at each message to get to the next desired message or to activate a desired option.

A disadvantage of the system described above is that, as the functionality (i.e. number of options) of the system increases, the number and complexity of the prompt messages increases. In some instances, it may become very difficult for a user to navigate through the system to get to a desired option. Although much work has been done in the area of interactive voice systems, the prior art does not adequately address the problem of being able to increase system functionality without appreciably increasing the difficulty of use of the system. Exemplary references are shown below.

U.S. Pat. No. 5,113,430 to Richardson, Jr. et al. and U.S. Pat. No. 5,187,735 to Garcia et al. disclose integrated voice-mail processing systems that provide multiple data base and/or service accesses in response to a single telephone call. The user is prompted for keypad selections and/or spoken voice prompts.

U.S. Pat. No. 5,179,585 to MacMillan, Jr. et al. discloses an integrated voice messaging/voice response system. Through one telephone call, a user can be transferred among various application modules (i.e. services) through the use of an interactive voice response module that offers a menu of available modules (a "compound session"). The system may require entry of an account number, a customer number or a password before access to the application modules is allowed.

U.S. Pat. No. 5,193,110 to Jones et al. discloses an integrated services platform for telephone communications.

A user is able to access an information service via a voice menu. A master control unit automatically connects the user to a selected APU (application processing unit) and the APU then provides the user with the requested information. Voice menus allow the caller to request several different types of services during a single call.

U.S. Pat. No. 4,598,367 to DeFrancesco et al. discloses a financial quotation system using synthetic speech. After verification of a user I.D., the user enters information via a telephone keypad in response to queries. Results are reported to the user via the telephone. A time-out disconnects the call if input information is not received after a predetermined time period.

U.S. Pat. No. 4,785,408 to Britton et al. discloses a dialogue production system for generating computer-controlled voice services. Timeout conditions can be checked to determine if a caller's response was rapid enough.

U.S. Pat. No. 4,920,558 and U.S. Pat. No. 4,920,562 to Hird et. al. disclose voice message menus for prompting a user of a telephone. A timeout is used to determine if any key has been pressed within a specified time limit.

U.S. Pat. No. 5,214,689 to O'Sullivan discloses an interactive transit information system that provides schedule information to a caller in response to voice message prompts. The system waits for a predetermined pause period to determine if a caller's entries are finished.

U.S. Pat. No. 5,222,120 to McLeod et al. discloses service selection to a telephone user via audible message menus. Authorization codes must be input before access to the service menu is allowed. Multiple subscribers may have the same access code with each subscriber being provided with a unique number for allowing access to that subscriber's preselected enhanced services.

U.S. Pat. No. 5,224,153 to Katz discloses a voice-data telephone interface that prompts a caller with oral instructions. The system has an automatic dialer for attaining connections to stored telephone numbers (i.e. services). A processor is actuated through a crossbar switch.

The following references disclose telephone communication of voice menus to a user in order to provide a selected service(s): U.S. Pat. No. 4,757,267 to Riskin; U.S. Pat. No. 4,878,239 to Solomon et al.; U.S. Pat. No. 4,942,616 to Linstroth et al.; U.S. Pat. No. 4,972,461 to Brown et al.; U.S. Pat. No. 5,132,549 to Bern and U.S. Pat. No. 5,199,062 to Von Meister et al.

The following references disclose the authorization of a user to access a service, using his telephone, via a PIN or other account number: U.S. Pat. No. 5,181,238 to Medamana et al. and U.S. Pat. No. 5,204,894 to Darden.

It is desirable to improve over the systems described above by providing an interactive voice response system that allows for increasing functionality without appreciably increasing the difficulty of use of the system.

SUMMARY OF THE INVENTION

According to the present invention, an interactive voice response system provides voice prompts that supply information to a user, request data from the user, and present the user with a plurality of selectable options. The voice prompts can be in any language, including Spanish and English. The user can first select one or more options by providing one or more letters of the alphabet corresponding to one or more of the selectable options. If the letter or letters that are provided by the user correspond to more than one selectable option, the user further selects one of the options from among the more than one options corresponding to the one or more letters. The user may provide a single letter corresponding to a first letter of the name of one or more of the options.

The user may select an option by pressing a particular key of a touch-tone telephone or by speaking a particular word or words into the touch-tone telephone. The user may reject an option by pressing a particular key of the touch-tone telephone or by speaking a particular word or words into the touch-tone telephone. The method of confirmation of a selected option may be constant for any selected option. Similarly, the method of rejecting a selected option may be constant for any option.

The system may be accessed via a conventional commercial telephone network. The system may include an automated call director and a voice processing system. The system may be used to provide payee selection for a bill payment system using in connection with a banking services.

Since the user can select a subset of options by entering a letter of the alphabet, the functionality of the system (i.e. number of options) can be increased without appreciably increasing the difficulty of use of the system. It is advantageous to use the system for payee selection in a bill payment system for providing banking services since the need for simplicity is great while the number of options can be substantial.

These and other objects and advantages of the present invention will become apparent upon reading the following detailed description and upon reference to the drawings.

BRIEF DESCRIPTION OF DRAWINGS

FIGS. 15A and 15B are a flow diagram illustrating a bill payment entry module.

DETAILED DESCRIPTION OF DRAWINGS

Figure 1:
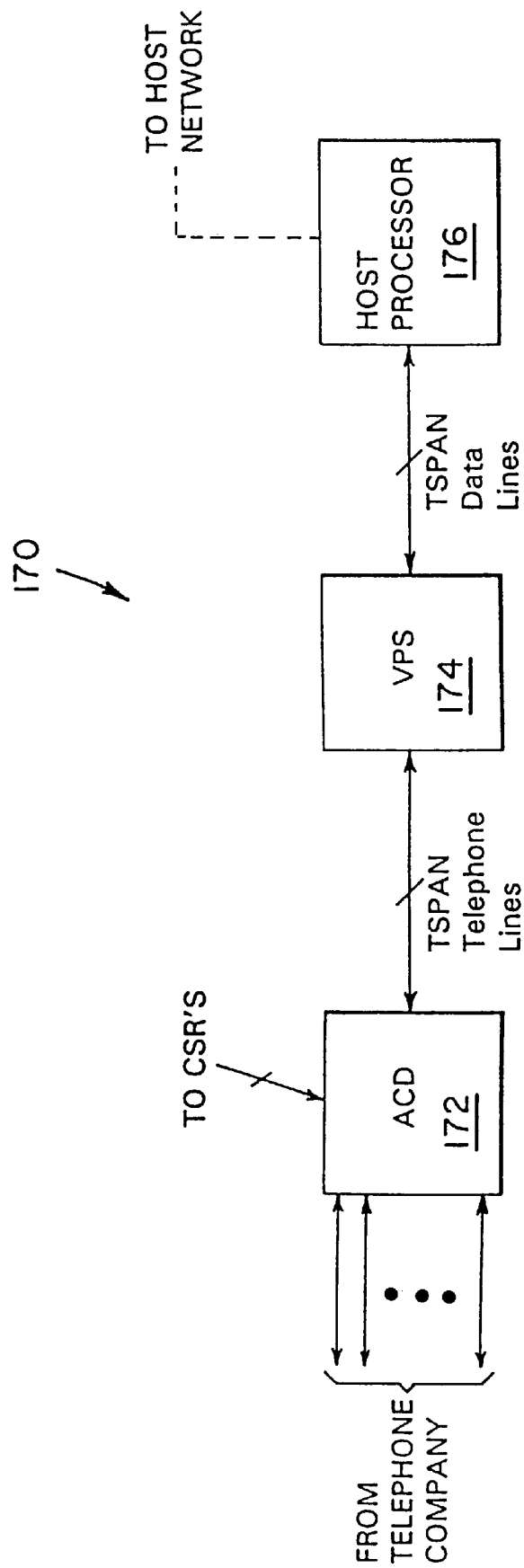
FIG. 1 illustrates an interactive voice response system according to the present invention.

Referring to FIG. 1, an interactive voice response system 170 includes an automated call director (ACD) 172, a voice processing system (VPS) 174, and a host processor 176. A user accesses the system by making a telephone call to an appropriate telephone number. The ACD 172 receives the call and passes the call on to the VPS 174, which provides the user with various voice prompts and accepts and processes input provided by the user. The user provides input by pressing buttons on a touch-tone telephone during the call. The VPS 174 is connected to the host processor 176 to allow the user to exchange information either with the host processor 176 or with a host network to which the host processor 176 is connected. It will be understood by one of ordinary skill in the art that there may be ways to access the system 170 other than by making a telephone call over a conventional commercial telephone network. For example, a telephone device could be directly wired to the ACD 172.

The ACD 172, such as the Galaxy model manufactured by Rockwell International Inc., handles a plurality of incoming telephone calls that are received on a plurality of conventional telephone lines provided by a conventional commercial telephone service company, such as NYNEX. The ACD 172 directs the incoming telephone calls through a conventional TSPAN telephone line that connects the ACD 172 with the VPS 174.

Under certain conditions, described in more detail hereinafter, the ACD 172 can also direct an incoming telephone call to a Customer Service Representative (CSR). When the VPS 174 receives a user input indicating that the user is to speak to a CSR, the VPS 174 transfers the user's call back to the ACD 172 which then transfers the call to a CSR. The user then speaks to the CSR through the ACD 172.

The VPS 174, which can be implemented using one of a variety of devices such as a model VPS 7500 or model 9000 manufactured by Periphonics Inc., provides a plurality of voice prompts to the user. Each call is handled separately by the VPS 174 and as a result the interaction between the VPS 174 and a particular user is not affected by interaction between the VPS 174 and other users.

The voice prompts provided to the user by the VPS 174 consist of voice messages of relatively short duration (i.e. a few seconds) that supply the user with information, urge the user to provide particular data, or request that the user choose among a plurality of options. When the user is urged to provide particular data or to choose among a variety of options, the user responds by pressing one or more keys on the user's touch-tone telephone. The VPS 174 can process the user's inputs and can provide subsequent prompts that vary according to which buttons are pressed by the user.

The VPS 174 is connected to and exchanges information with the host processor 176 via a plurality of conventional TSPAN data lines. The information exchanged between the VPS 174 and the host processor 176 consists of high level messages containing user data requests for user data. For example, when the user first accesses the system 170, the VPS 174 requests that the user provide identification information. The VPS 174 then forwards the identification information to the host processor 176 for verification. Some of the information provided to the host processor 176 may be transmitted over the network to which the host processor 176 is connected.

The following description relates to a plurality of flow diagrams that describe operation of the software on the VPS 174. The flow diagrams are similar to flowcharts in that the flow diagrams show the flow of steps taken by the system 170 and show branches in the flow (i.e. more than one path from a single step) that are conditioned upon a particular state or action by the user. Text that is shown in a step in the flow diagrams in quotations represents a message heard by a user that reaches that step. Branches from a step show the input by a user that causes the branch. For example, a line drawn from step A to step B having the words "caller presses zero" superimposed thereon indicates that the user transitions from step A to step B by pressing the "0" key on a touch-tone telephone at step A.

For the embodiment described herein, a user action represented on the flow diagrams as "YES" indicates that the user presses the "1" key on the touch-tone telephone keypad to take that particular action and a user action represented on the flow diagrams as "NO" indicates that the user presses the "2" key on the telephone touch-tone keypad to take that particular action. Note, however, that it is understood by one of ordinary skill in the art that it is possible to employ other techniques for having the user provide an affirmative response or a negative response, such as using conventional speech recognition technology that allows the user to simply speak the words "yes" and "no" or to speak some other appropriate phrases consisting of one or more words.

Figure 2A:
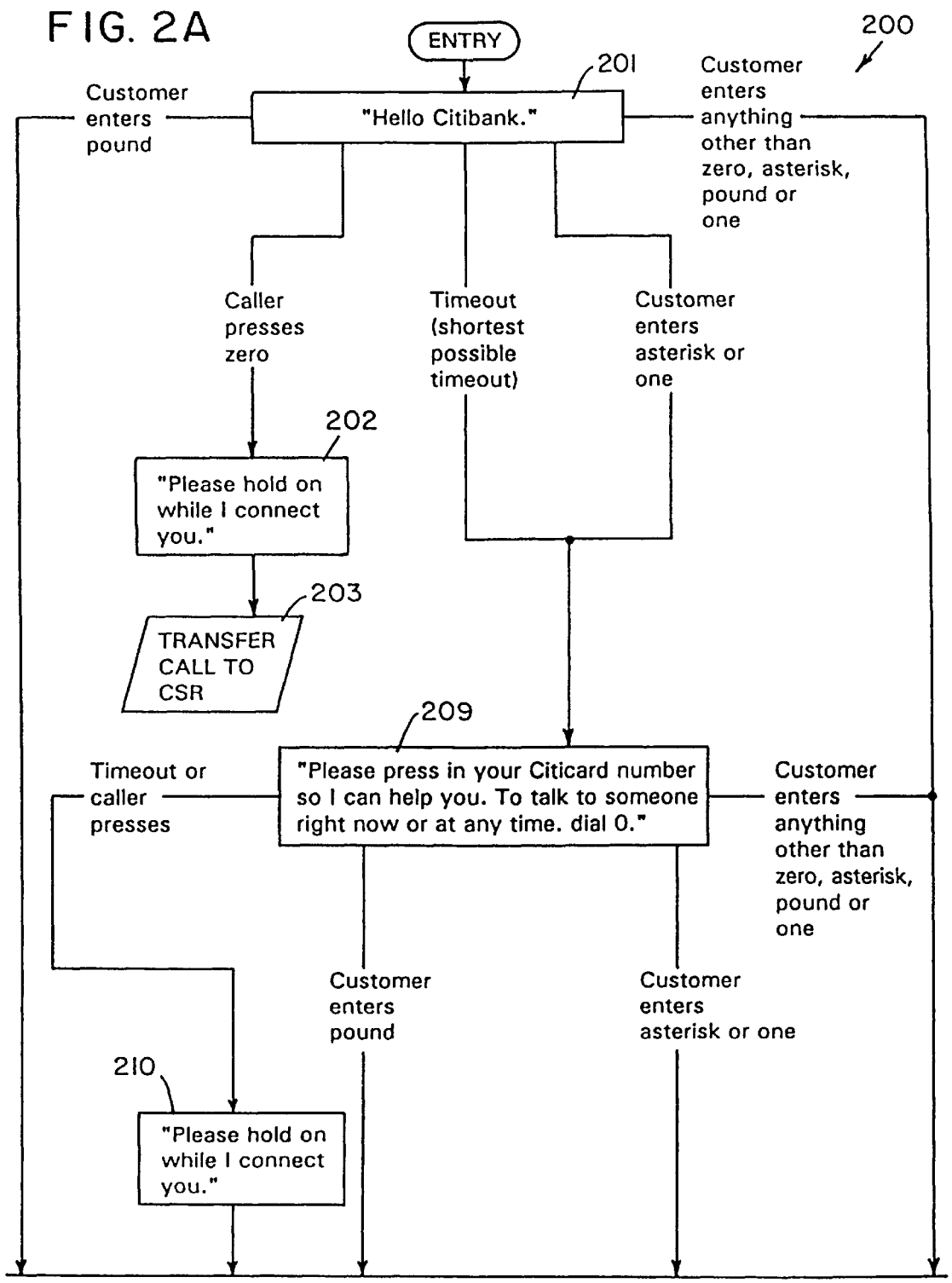
FIGS. 2A and 2B are a flow diagram illustrating processing when a telephone call is first received by the interactive voice response system.
Figure 2B:
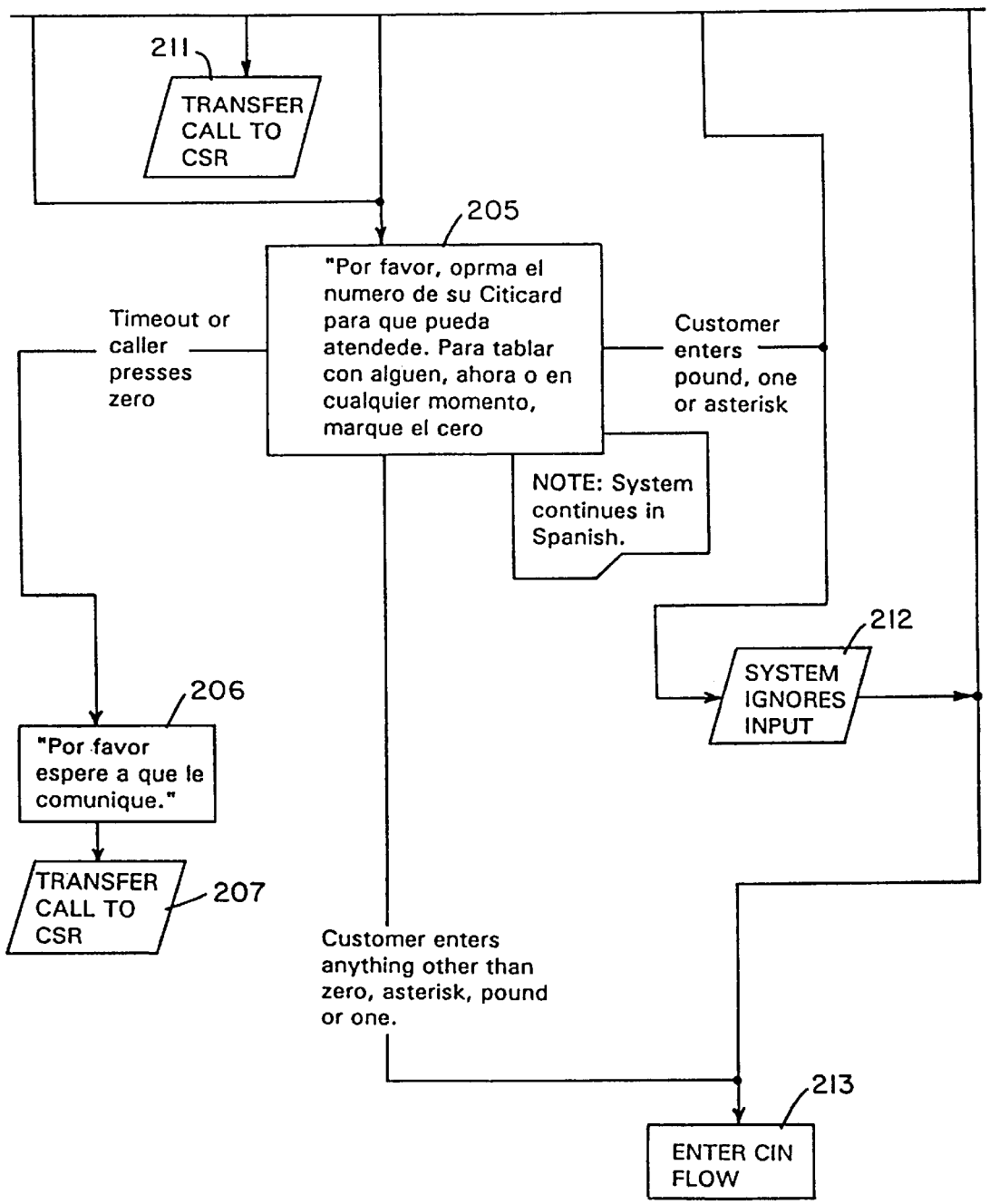

Referring to FIGS. 2A and 2B, a flow diagram 200 illustrates processing when a call is first received by the interactive voice response system 170. At a first step 201, the caller is greeted with an introductory message. From there, control is transferred to one of a plurality of different steps depending upon the user's response to the introductory message.

If the user presses a zero (i.e. the "0" key on the touch-tone telephone) at the step 201, control passes from the step 201 to a step 202 where the user is given a message indicating that the user will be connected to a Customer Service Representative (CSR). Following the step 202 is a step 203 where the user is connected to the CSR. At this point, control of the interactive voice response system 170 ends since the user is now speaking with the CSR. Access to the CSR is provided at various points throughout the flow of the software for the system 170 in order to facilitate ease of use of the system.

If the user presses a pound (i.e. the "#" key on the touch-tone telephone) at the step 201, control passes from the step 201 to a step 205, where processing for the interactive voice response system continues in Spanish. That is, entering a pound will cause the system to provide all subsequent voice messages in the Spanish language. Following the step 205 are steps 206, 207 where the user is connected to a CSR in response to a timeout or to the user pressing "0". In this case, however, the particular CSR to which the user is connected will be able to speak Spanish. Note that, although the description of the system 170 which follows will illustrate the voice messages being in the English language, the invention can be practiced with voice prompts in any language. The English (and Spanish) prompts shown herein are for illustrative purposes only and are not meant to indicate that the system 170 is restricted to voice prompts in any one particular language.

If at the step 201 the user enters an asterisk ("*") or a "1" or if the user makes no entry at all for a predetermined amount of time (such as one second), control passes from the step 201 to a step 209 where the user is prompted to enter a Customer Identification Number (CIN). The CIN is the user's identification number that provides the user with access to the system 170 and with access to the user's accounts.

If at the step 209 the user enters a "0" or makes no entry at all after a predetermined amount of time (such as one second), control passes from the step 209 to a step 210, where the user is given a message indicating that the user will be connected to a CSR. Following the step 210 is a step 211 where the user is connected to the CSR. At this point, control of the interactive voice response system 170 ends since the user is now speaking with the CSR. Note that it is also possible at the step 209 for the user to enter a pound ("#") to transfer to the step 205 where processing continues in the Spanish language, as described above.

If at the step 209 the user enters an asterisk ("*") or a "1", control passes from the step 209 to a step 212, where entry of the "*" or the "1" is ignored. This occurs because, in the embodiment illustrated herein, no customer identification numbers begin with an asterisk "*" or "1". Following the step 212 or following the step 209 if the user enters anything other than a "0", asterisk ("*"), pound ("#"), or "1", is a step 213 where the customer enters a Customer Identification number (CIN).

Figure 3A:
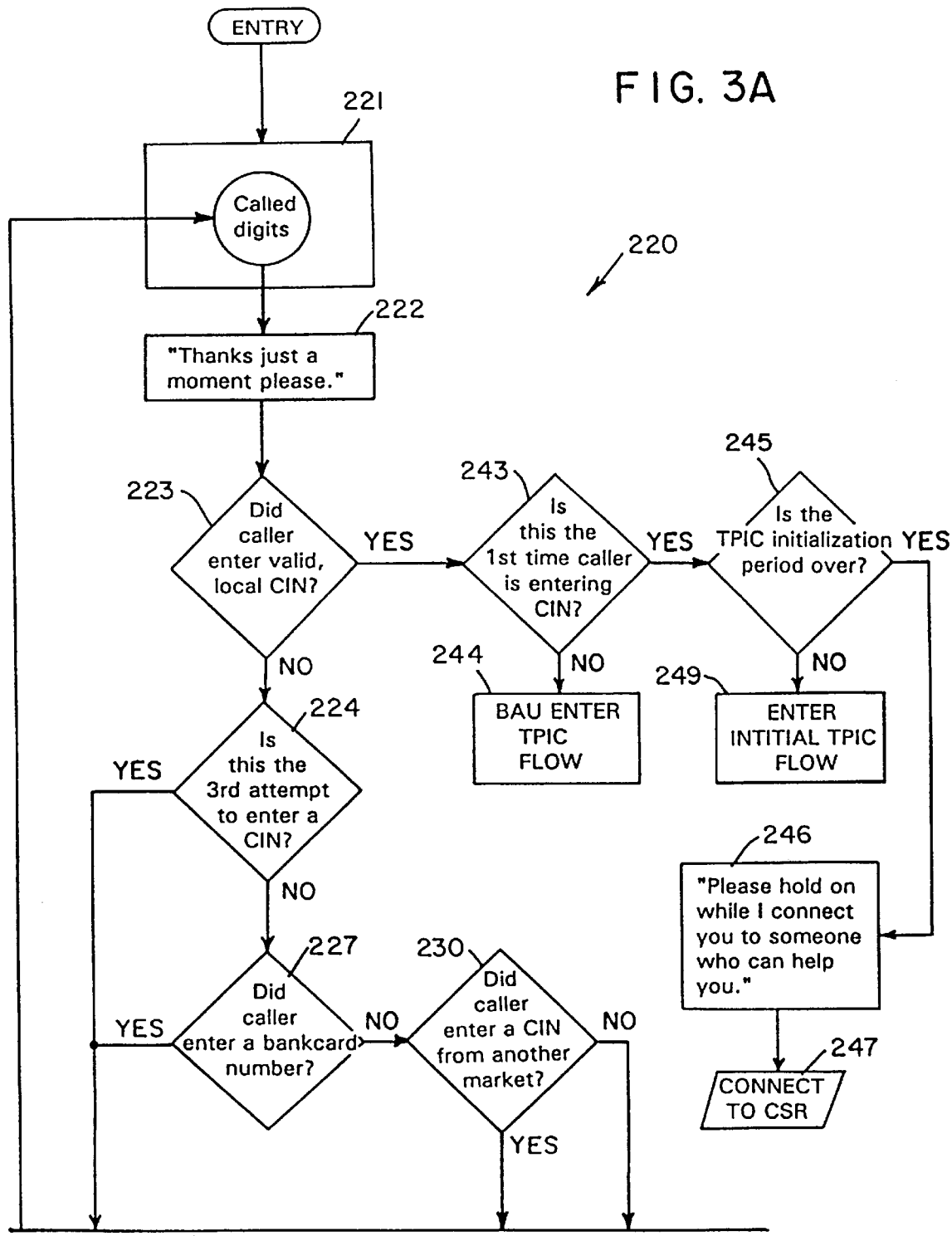
FIGS. 3A and 3B are a flow diagram illustrating entry of a user's customer identification number.
Figure 3B:
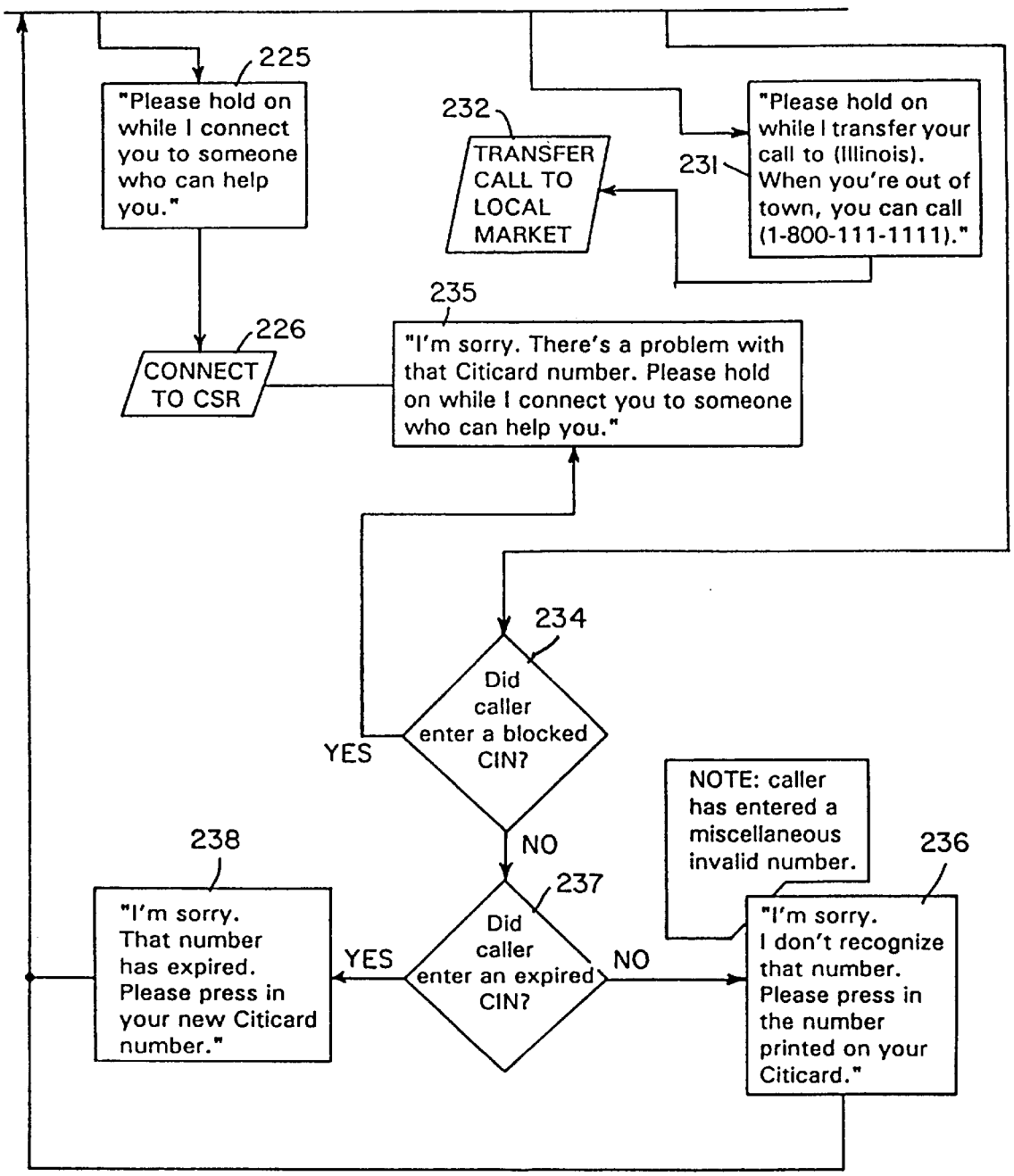

Referring to FIGS. 3A and 3B, a flow diagram 220 illustrates in detail the step 213 of FIG. 2 where a user enters a customer identification number (CIN). At a first step 221, the digits of the CIN are entered by the user. Since a CIN will have a particular pre-determined number of digits, processing at the step 221 ends when the use has entered that number of digits. Following the step 221 is a step 222 where the user is provided with a message asking the user to wait while the CIN that is entered by the user is processed by the system 170.

Following the step 222 is a test step 223 where the validity of the CIN is tested. If at the step 223 it is determined that the CIN is not valid, control passes from the step 223 to a test step 224. If the user has made three attempts to enter a valid CIN, control passes from the step 224 to a step 225 where a message is provided indicating that the user will be connected to a CSR. Following the step 225 is a step 226 where the user is connected to the CSR. At this point, control of the interactive voice response system 170 ends since the user is now speaking with the CSR.

If at the step 224 it is determined that the user has not yet made three attempts to enter a CIN, control passes from the step 224 to a step 227 to determine if the user has entered a bankcard number. A bankcard number is different from a CIN. If the number entered by the user is not a valid CIN, it is possible that the user has instead erroneously entered a bankcard number. If so, control passes from the step 227 to the steps 225,226 where the user is connected to the CSR, as described above.

If the user has not entered either a valid CIN or a bankcard number, control passes from the step 227 to a test step 230 to determine if the user has entered a CIN from another market (i.e. another geographic area/computer system). If so, then control passes from the step 230 to a step 231 where a message is provided indicating that the user will be transferred to the appropriate market (computer system). In the example shown at the step 231, the user is transferred to the Illinois market. Following the step 231 is a step 232 where the user is transferred to the appropriate market. At this point, control of the interactive voice response system 170 ends since the user has been transferred to another system.

If at the step 230 it is determined that the user has not entered a CIN from another market, control passes from the step 230 to a step 234 to determine if the user has entered a blocked CIN. A blocked CIN is one which has been disabled so that the user cannot access the system 170. If so, control passes from the step 234 to a step 235 where a message is provided indicating to the user that there is a problem with the CIN and that the user will be transferred to a CSR. Following the step 235 is the step 226 where the user is transferred to the CSR, as described above. A CSR can unblock the CIN.

If at the step 234 it is determined that the user has not entered a blocked CIN, control passes from the step 234 to a step 237 to determine if the user has entered an expired CIN. If so, control passes from the step 237 to the step 238 where the user is provided with a message indicating that the CIN entered at the step 221 has expired and prompting the user to enter a new CIN. Otherwise, control passes from the step 237 to a step 239, where the user is prompted to reenter the CIN. Note that the user reaches the step 239 in response to entering a non-valid CIN that is not a bankcard number, not a CIN from another market, and not a blocked or expired CIN. Following both the step 238 and the step 239, control passes back to the step 221 where the user reenters the CIN.

If it is determined at the step 223 that the user has entered a valid CIN at the step 221, control passes from the step 223 to a step 243 to determine if the current session is the first time the user has used the CIN that was entered at the step 221. If not, control passes from the step 243 to a step 244 where the user enters a Telephone Personal Identification Code (TPIC) associated with the CIN. The step 244 will be described in more detail hereinafter. Note that the acronym "BAU" shown on the flow diagram 220 stands for "Business As Usual".

If the user has never before used the CIN that is entered at the step 221, control passes from the step 243 to a step 245 to determine if the TPIC initialization period has expired. The TPIC initialization period is the maximum amount of time between when the user first being given a CIN and when the user must first use the CIN. If the TPIC initialization period has expired, control passes from the step 245 to a step 246 where a message is provided indicating that the user will be connected to a CSR. Following the step 246 is a step 247 where the user is connected to the CSR. At this point, control of the interactive voice response system 170 ends since the user is now speaking with the CSR.

If at the step 245 it is determined that the TPIC initialization period has not expired, control passes from the step 245 to a step 249 where the user enters the initial TPIC, as described in more detail hereinafter.

Figure 4A:
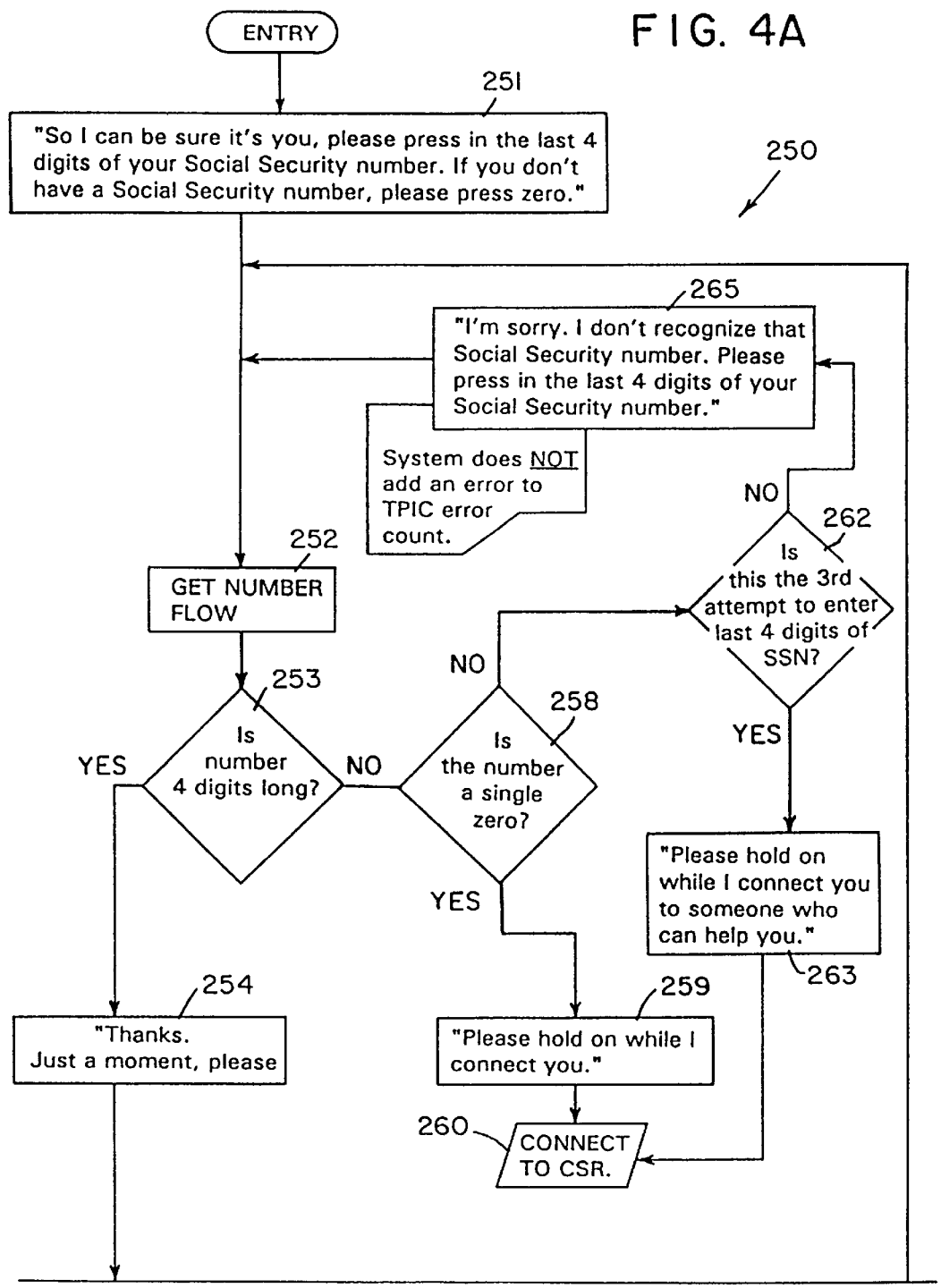
FIGS. 4A and 4B are a flow diagram illustrating processing for entering an initial Telephone Personal Identification Code (TPIC).
Figure 4B:
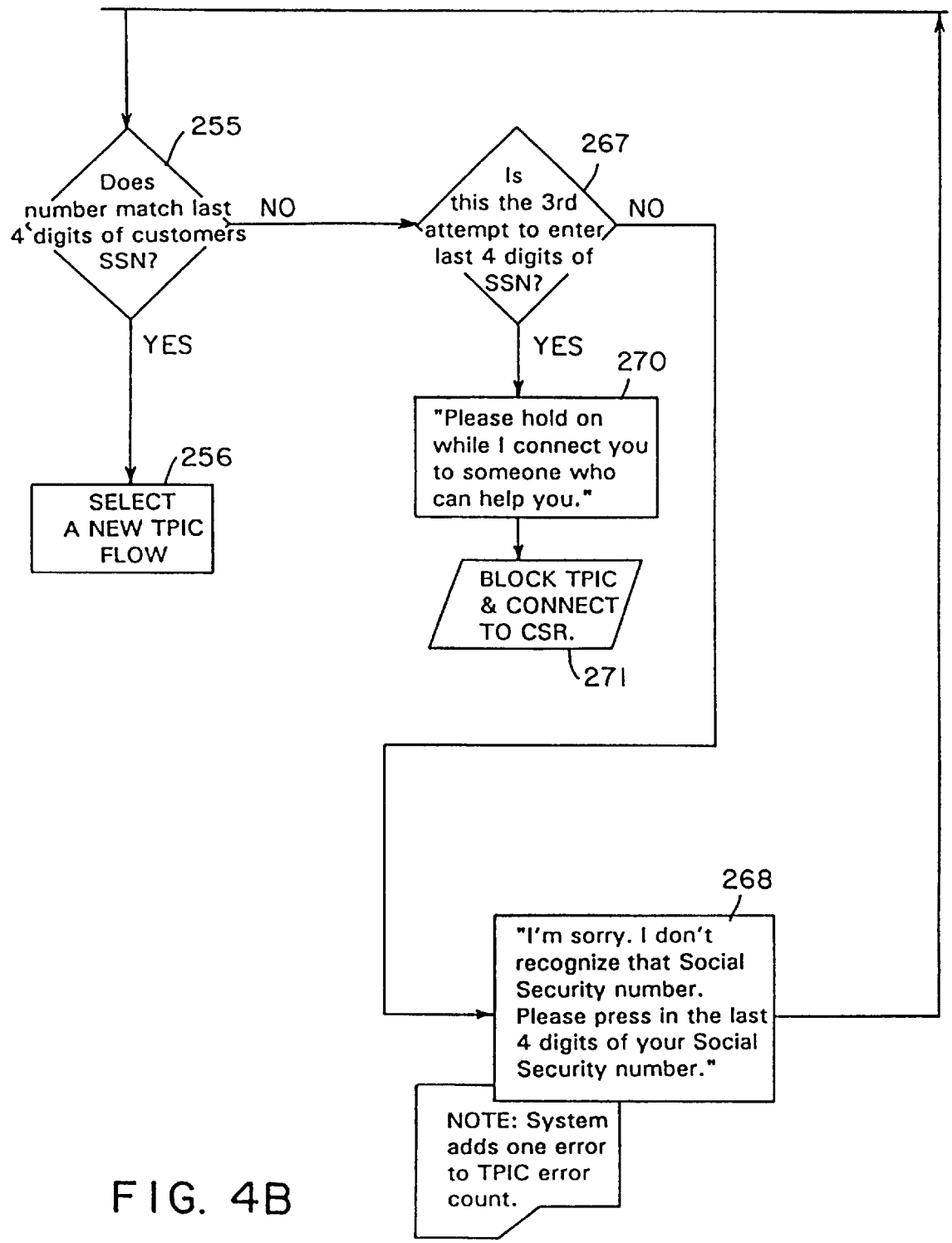

Referring to FIGS. 4A and 4B, a flow diagram 250 illustrates details of initial processing at the step 249 of FIG. 3 for entering the initial TPIC. Processing begins at a step 251 where a prompt is provided requesting the user enter the last four digits of the user's Social Security Number (SSN). Following the step 251 is a step 252 where the system 170 receives the digits entered by the user. Details of the step 252 are described in more detail hereinafter.

Following the step 252 is a test step 253 which determines if the number entered by the user is four digits long. If so, control passes from the step 253 to a step 254 where the user is asked to wait while the number entered by the user is checked by the system 170. Following the step 254 is a test step 255 which determines if the four digit number entered by the user at the step 252 is the last four digits of the user's SSN. If so, then control passes from the step 255 to the step 256 where the user selects a new TPIC. The step 256 is described in more detail hereinafter.

If it is determined at the step 253 that the user has not entered four digits, control passes from the step 253 to a step 258 to determine if the user has entered a single "0". If so, control passes from the step 258 to a step 259 where a prompt is provided indicating that the user will be connected to a CSR. Following the step 259 is a step 260 where the user is connected to the CSR. At this point, control of the interactive voice response system 170 ends since the user is now speaking with the CSR.

If it is determined at the step 258 that the user has not entered a single "0", control passes from the step 258 to a step 262 to determine if the user has tried three times to enter the last four digits of the user's SSN. If so, control passes from the step 262 to a step 263 where a message is provided indicating that the user will be connected to a CSR. Following the step 263 is the step 260 where the user is connected with the CSR, as described above.

If it is determined at the step 262 that it is not the user's third attempt to enter the last four digits of the user's SSN, control passes from the step 262 to a step 265 where the user is provided with a prompt requesting reentry of the last four digits of the user's SSN. Following the step 265 is the step 252 where the user reenters the SSN. Note that the TPIC error count is not incremented at the step 265. The TPIC error count is described in more detail hereinafter.

If a determination is made at the step 255 that the four digits entered by the user at the step 252 are not the last four digits of the user's SSN, control passes from the step 255 to a step 267 to determine if the user has made three attempts to enter the last four digits of the user's SSN. If not, control passes from the step 267 to a step 268 where the user is provided with a message requesting reentry of the last four digits of the user's SSN. Following the step 268 is the step 252 where the user reenters the SSN. Note that, unlike the step 265, the TPIC error count is incremented at the step 268.

If a determination is made at the step 267 that the user has made three attempts to enter the last four digits of the user's SSN, control passes from the step 267 to a step 270, where a prompt is provided indicating that the user will be connected to a CSR. Following the step 270 is a step 271 where the user is connected to the CSR and the TPIC associated with the user is blocked. At this point, control of the interactive voice response system 170 ends since the user is now speaking with the CSR. Blocking a TPIC results in the TPIC being unusable until the TPIC has been unblocked. A CSR can unblock a TPIC.

Figure 5A:
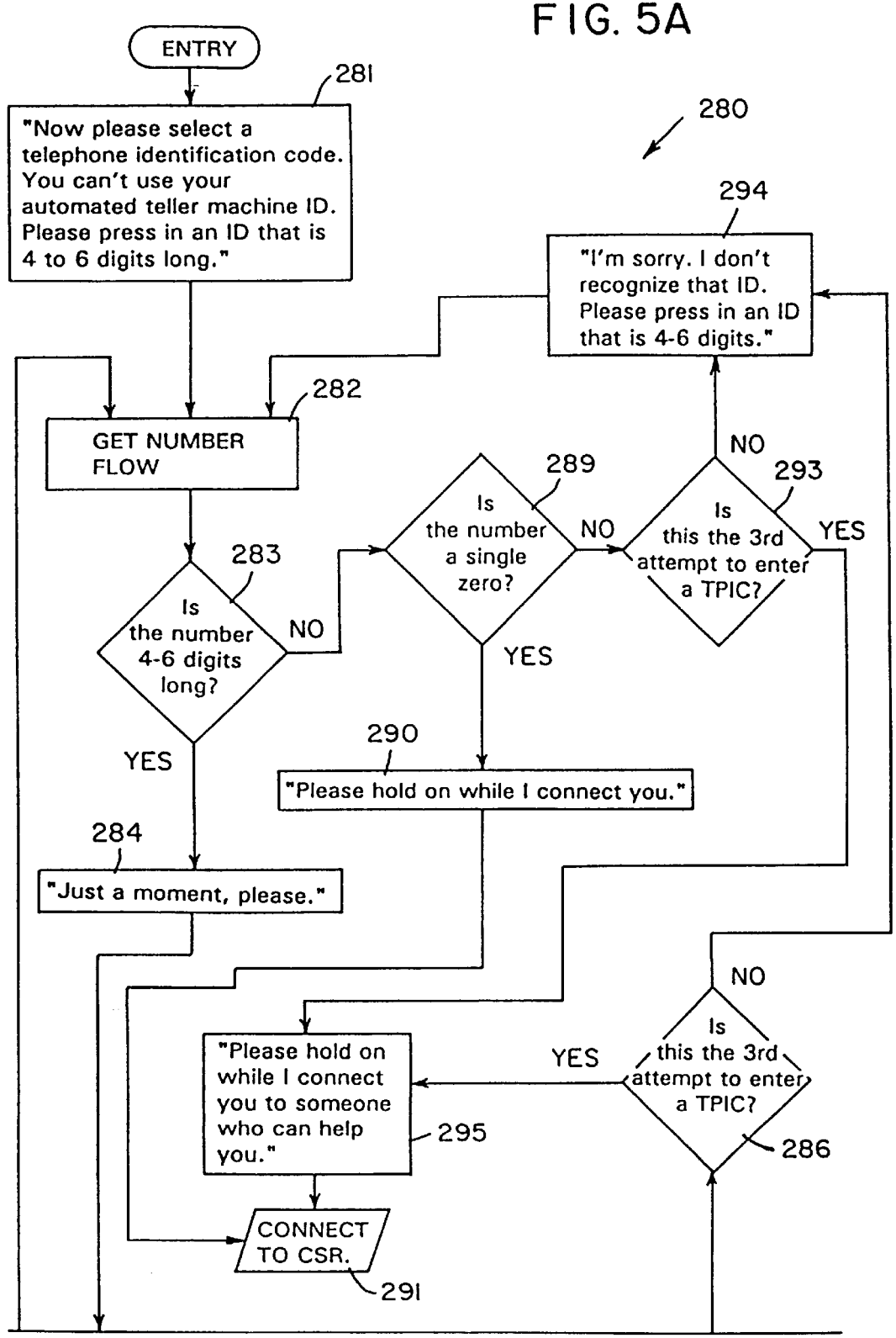
FIGS. 5A and 5B are a flow diagram illustrating further processing for entering an initial TPIC.
Figure 5B:
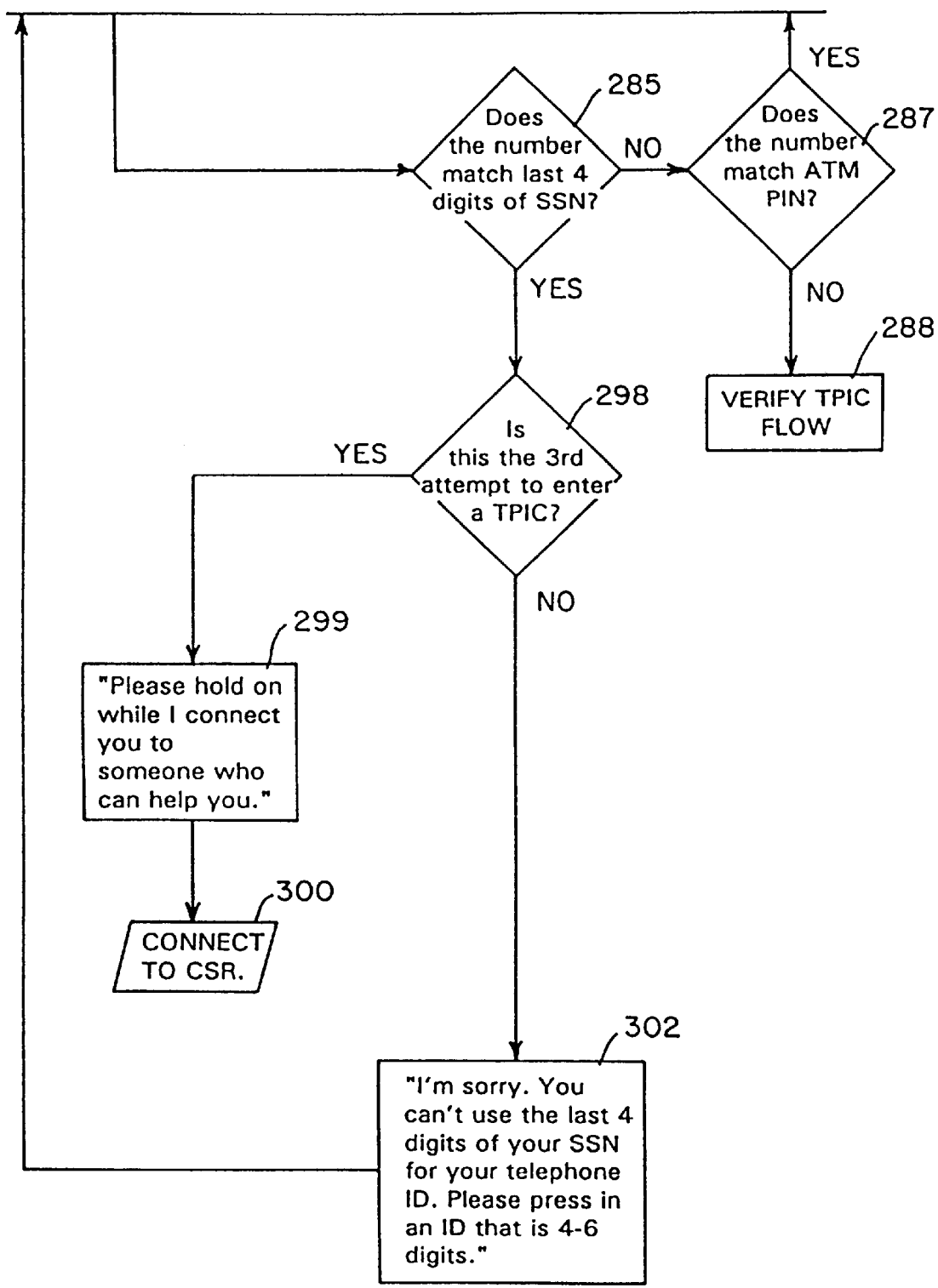

Referring to FIGS. 5A and 5B, a flow diagram 280 illustrates in detail the step 256 of FIGS. 4A and 4B for selecting a new TPIC. Processing begins at a step 281 where the user is prompted to enter numbers for a TPIC. The user enters the TPIC at a step 282. The TPIC entered by the user must be between four and six digits long and cannot be the same number as the user's automated teller machine (ATM) ID. Following the step 282 is a step 283 which determines if the number entered by the user is between four and six digits long. If so, control passes from the step 283 to a step 284 where a message is provided indicating to the user that the number entered by the user is being processed by the system 170.

Following the step 284 is a test step 285 which determines if the number entered by the user matches the last four digits of the user's SSN. If not, control passes from the step 285 to a test step 286 to determine if the number entered by the user matches the user's ATM ID. If at the step 286 it is determined that the number is not the user's ATM ID, control passes from the step 286 to a step 287 where the TPIC is verified. Verification of the TPIC at the step 287 is described in more detail hereinafter.

If it is determined at the step 283 that the user has not entered a number that is between four and six digits long at the step 282, control passes from the test step 283 to a step 289 which determines if the number entered by the user is a single "0". If the number entered by the user is a single "0", control passes from the step 289 to a step 290 where a prompt is provided indicating that the user will be connected to a CSR. Following the step 290 is a step 291 where the user is connected to the CSR. At this point, control of the interactive voice response system 170 ends since the user is now speaking with the CSR.

If at the step 289 it is determined that the number entered by the user is not a single "0", control passes from the step 289 to a test step 293 to determine if the user has made three separate attempts to enter a TPIC. The number of attempts to enter a TPIC is the TPIC error count, discussed above in connection with the steps 268, 265 of FIGS. 4A and 4B. If at the step 293 it is determined that the TPIC error count is not three, control passes from the step 293 to a step 294 where a prompt is provided requesting that the user reenter the TPIC. Following the step 294 is the step 282 where the user enters the TPIC.

If at the step 293, it is determined that the user has attempted to enter a TPIC three times, control passes from the step 293 to a step 295 where a prompt is provided indicating that the user will be connected to a CSR. Following the step 295 is the step 291 where the user is connected to the CSR, as discussed above.

The test step 286, discussed above, determines if the number entered by the user matches the user's Automated Teller Machine (ATM) ID number. If it is determined at the step 286 that the number entered by the user does match the ATM ID, control passes from the step 286 to a step 296 to determine if the user has made three attempts to enter a TPIC. If not, control passes from the step 296 to the step 294, which is discussed above. If the user has made three attempts to enter a TPIC, control passes from the step 296 to the step 295 where a message is provided indicating that the user will be connected to a CSR. The step 295 is followed by the step 291, where the user is connected to the CSR, as discussed above.

The test step 285 determines if the number entered by the user at the step 282 matches the last four digits of the user's Social Security Number (SSN). If so, control passes from the step 285 to a step 298 which determines if the user has made three attempts to enter a TPIC. If so, control passes from the step 298 to a step 299 where a prompt is provided indicating that the user will be connected to a CSR. Following the step 299 is a step 300 where the user is connected to the CSR. At this point, control of the interactive voice response system 170 ends since the user is now speaking with the CSR.

If at the test step 298 it is determined that the user has not made three attempts to enter a TPIC, control passes from the step 298 to a step 302 where a prompt is provided indicating that the user cannot use the last four digits of the user's SSN as a TPIC. Following the step 302 is the step 282 where the user reenters a TPIC.

Figure 6:
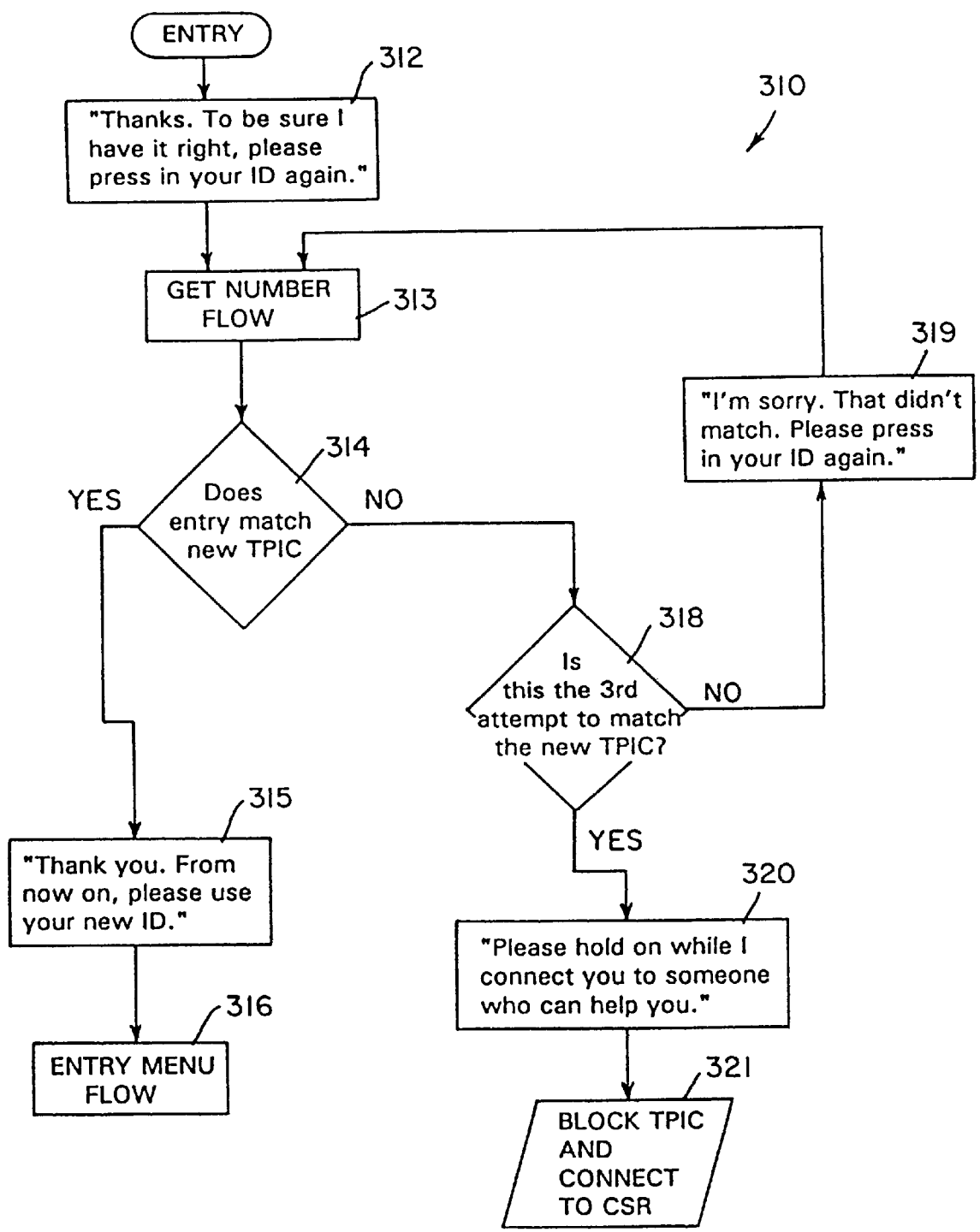
FIG. 6 is a flow diagram illustrating further processing for entering an initial TPIC.

Referring to FIG. 6, a flow diagram 310 illustrates in detail the verify TPIC step 287 of FIGS. 5A and 5B. At a first step 312, a prompt is provided requesting that the user reenter the TPIC in order to verify the previous entry of the new TPIC. Following the step 312 is a step 313 where the user provides the TPIC. The step 313 where the user provides the TPIC is described in more detail hereinafter.

Following the step 313 is a test step 314 which determines if the number entered by the user at the step 313 is the same TPIC entered by the user at the step 282 of FIGS. 5A and 5B. That is, the user must enter the same TPIC twice in order to verify a new TPIC. If at the step 314 the TPIC entered by the user at the step 313 matches the previously entered TPIC, control passes from the step 314 to a step 315 where a prompt is provided indicating that the TPIC has been registered by the system 170. Following the step 315 is a step 316 where the user is provided with an entry menu, which is described in more detail hereinafter.

If at the test step 314, it is determined that the number entered by the user at the step 313 does not match the TPIC previously entered by the user at the step 282 of FIGS. 5A and 5B, then control passes from the step 314 to a step 318 to determine if the user has made three attempts to verify the TPIC. If not, control passes from the step 318 to a step 319 where a prompt is provided requesting that the user reenter the TPIC. Following the step 319 is the step 313 where the user reenters the TPIC.

If at the step 318 the user has made three unsuccessful attempts to reenter the new TPIC, control passes from the step 318 to a step 320 where a prompt is provided indicating that the user will be connected to a CSR. Following the step 320 is a step 321 where the user is connected with the CSR and the TPIC is blocked. At this point, control of the interactive voice response system 170 ends since the user is now talking to the CSR. Note that the CSR can unblock the TPIC after speaking with the user.

Figure 7:
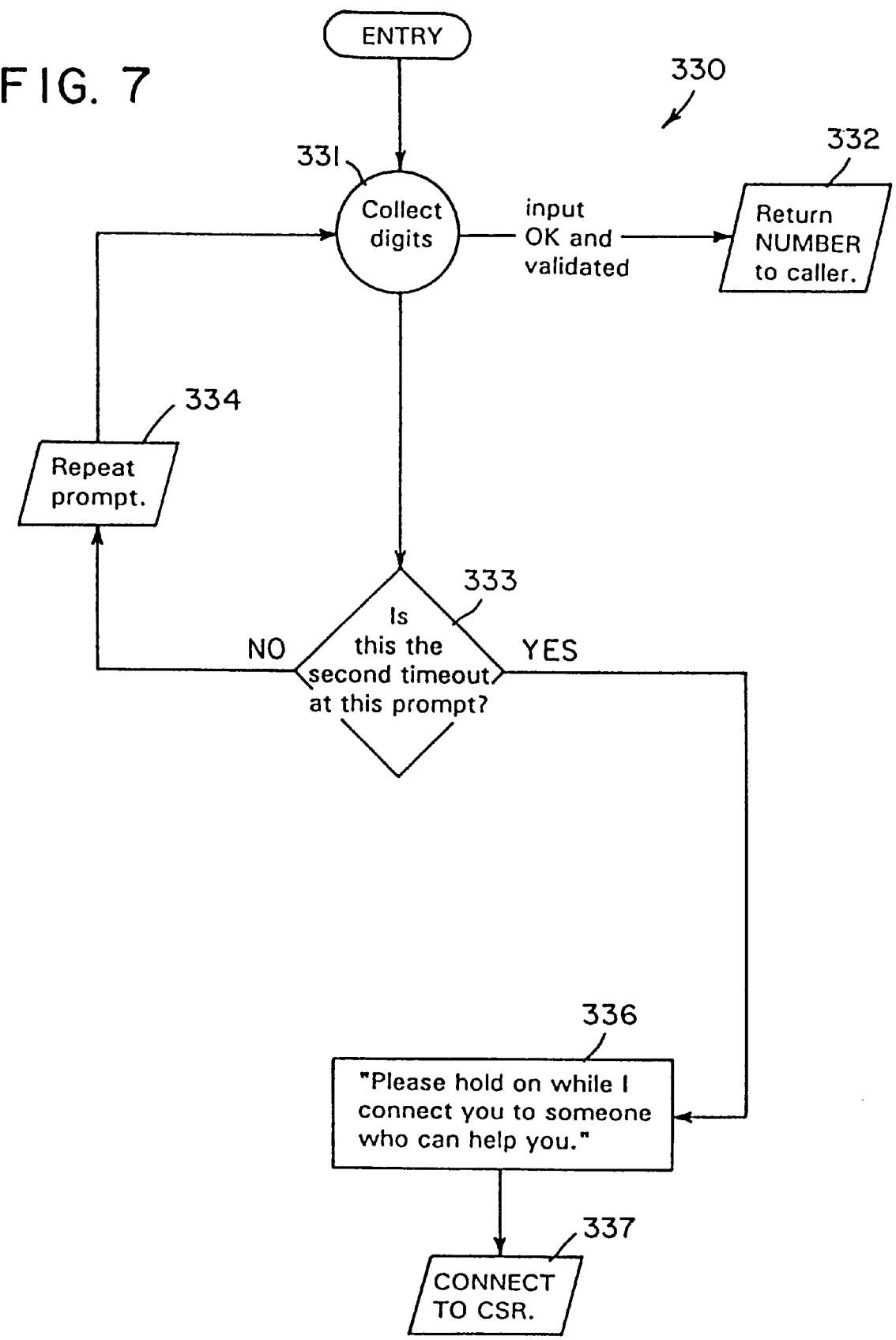
FIG. 7 is a flow diagram illustrating processing for entry of numbers by a user.

Referring to FIG. 7, a flow diagram 330 illustrates in detail the step 313 of FIGS. 6A and 6B and the step 212 of FIG. 5. At a first step 331, the digits entered by the user are collected. If the input is OK and validated, control passes from the step 331 to a step 332 where the number entered by the user is returned to the calling procedure (i.e. the step 282 in FIG. 5 or the step 313 in FIG. 6). If, on the other hand, the user does not provide a number entry at the prompt, control passes from the step 331 to a step 333 to determine if the user has timed out (i.e. not provided any input for one second) for a second time. If not, control passes from the step 333 to a step 334 where the prompt requesting that the user input digits is repeated to the user. Following the step 334 is the step 331 where the user provides the numeric entry.

If at the step 333 it is determined that the user has timed out for a second time, control passes from the step 333 to a step 336 where a prompt is provided indicating that the user will be connected to a CSR. Following the step 336 is a step 337 where the user is connected to the CSR. At this point, control of the interactive voice response system 170 ends since the user is now speaking with the CSR.

Figure 8A:
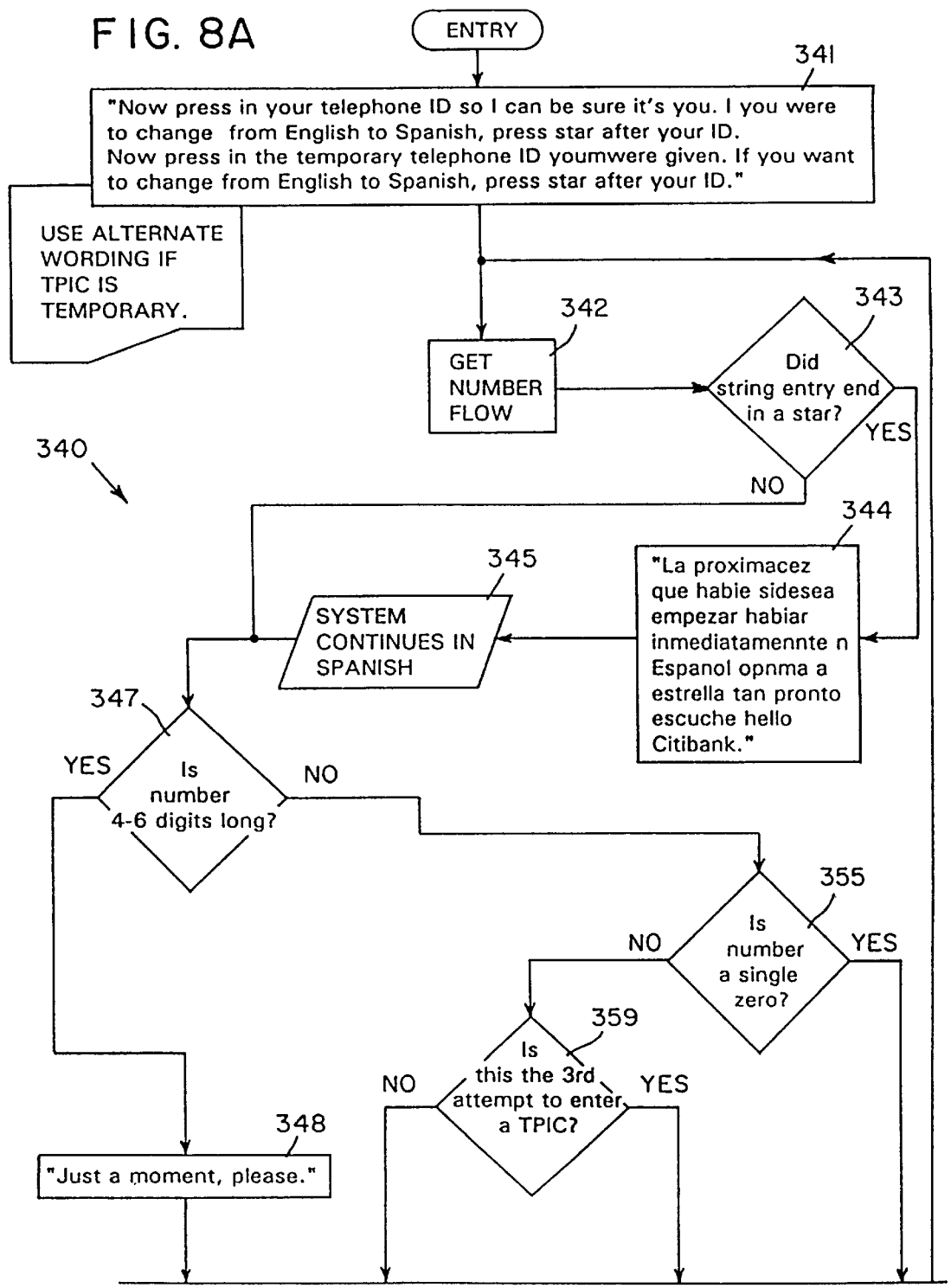
FIGS. 8A and 8B are a flow diagram illustrating in detail a particular step of FIG. 3.
Figure 8B:
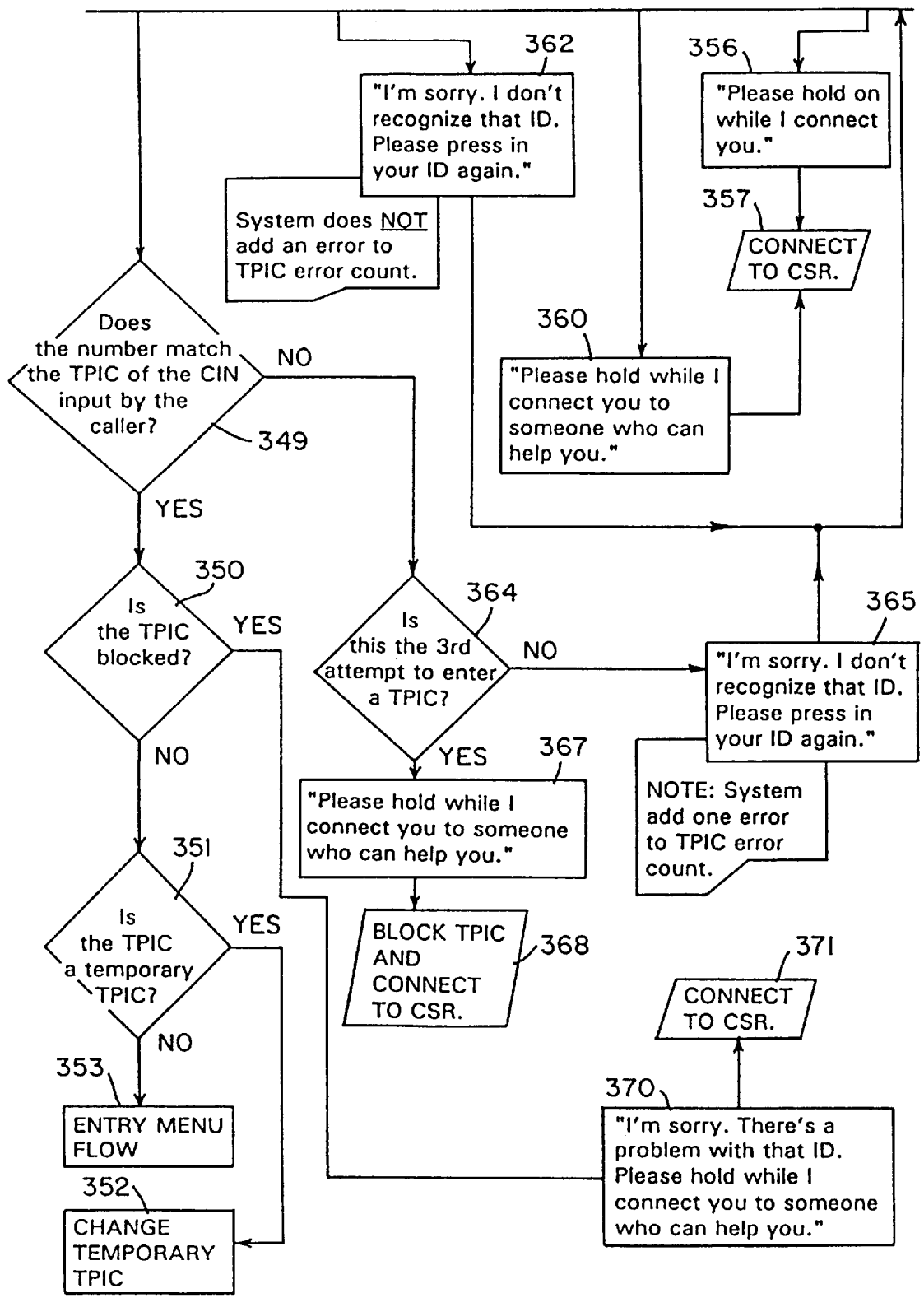

Referring to FIGS. 8A and 8B, a flow diagram 340 illustrates in detail the step 244 of FIGS. 3A and 3B where the user enters a TPIC. At a first step 341, a prompt is provided to request the user to enter the TPIC or the temporary TPIC, as appropriate. The temporary TPIC is described in more detail hereinafter. Note also that at the step 341, the user is informed that processing can be continued in the Spanish language by entering a pound ("#"). Switching to the Spanish language is described in more detail, above.

Following the step 341 is a step 342 where the user enters the TPIC. The step 342 is shown in detail and described above in connection with FIG. 7. Following the step 342 is a test step 343 which determines if the user entered a pound ("#") at the step 342. If so, control passes from the step 343 to the steps 344 and 345 where the user is provided with a message indicating that the processing will continue in the Spanish language and where the system proceeds to provide further messages in the Spanish language. Following the step 345 or following the step 343 in response to the user not entering a pound ("#"), is a step 347 which determines if the number provided by the user is between four and six digits long. If so, control passes from the step 347 to a step 348 where a prompt is provided requesting that the user wait while the system 170 verifies the TPIC. Following the step 348 is a step 349 which determines if the TPIC entered by the user at the step 342 matches the TPIC of the CIN that was provided by the user at a previous step. If so, control passes from the step 349 to the step 350 which determines if the user's TPIC is blocked.

If the user's TPIC is not blocked, control passes from the step 350 to a step 351 to determine if the user's TPIC is a temporary TPIC. If so, control passes from the step 351 to a step 352 where the user changes the temporary TPIC. The temporary TPIC and the process of changing the temporary TPIC are described in more detail hereinafter. If at the step 351 it is determined that the user's TPIC is not a temporary TPIC, control passes from the step 351 to a step 353 where the user is provided with the entry menu. The entry menu is described in more detail hereinafter.

If at the test step 347 it is determined that the number entered by the user is not between four and six digits long, control passes from the step 347 to a step 355 to determine if the user has entered a single "0". If so, control passes from the step 355 to a step 356 where a prompt is provided to indicate that the user will be connected to a CSR. Following the step 356 is a step 357 where the user is connected to the CSR. At this point, control of the interactive voice response system 170 ends since the user is now speaking with the CSR.

If at the step 355 the user has not entered a single "0", control passes from the step 355 to a step 359 to determine if the user has made three attempts to enter a TPIC. If the user has made three attempts to enter a TPIC, control passes from the step 359 to a step 360 where a prompt is provided to indicate that the user will be connected to a CSR. Following the step 360 is the step 357 where the user is connected to the CSR, as described above.

If at the test step 359 the user has not made three attempts to enter a TPIC, control passes from the step 359 to a step 362 where a message is provided indicating that the user should reenter the TPIC. Following the step 362 is the step 342 where the user enters the TPIC, as described above.

If at the test step 349 the TPIC entered by the user at the step 342 does not match the TPIC associated with the CIN provided by the user, then control passes from the step 349 to a step 364 to determine if the user has made three attempts to enter a TPIC. If the user has not made three attempts to enter a TPIC, control passes from the step 364 to a step 365 where a prompt is provided to request the user to reenter the TPIC. Note that at the step 365, the system adds one to the TPIC error count. Following the step 365 is the step 342, described above, where the user enters to TPIC.

If at the step 364 the user has attempted to enter a TPIC three times, control passes from the step 364 to a step 367 where a prompt is provided to indicate that the user will be connected to a CSR. Following the step 367 is a step 368 where the user is connected to the CSR and the TPIC entered by the user is blocked. At this point, control of the interactive voice response system 170 ends since the user is now speaking with the CSR. Blocking a TPIC results in the TPIC being unusable until the TPIC has been unblocked. A CSR can unblock a TPIC after speaking with the user.

If at the step 350 the user has entered a valid CIN but the user's TPIC is blocked, then control passes from the step 350 to a step 370 where a prompt is provided to indicate that the user will be connected to a CSR. Following the step 370 is a step 371 where the user is connected to the CSR. At this point, control of the interactive voice response system 170 ends since the user is now speaking with the CSR.

Figure 9A:
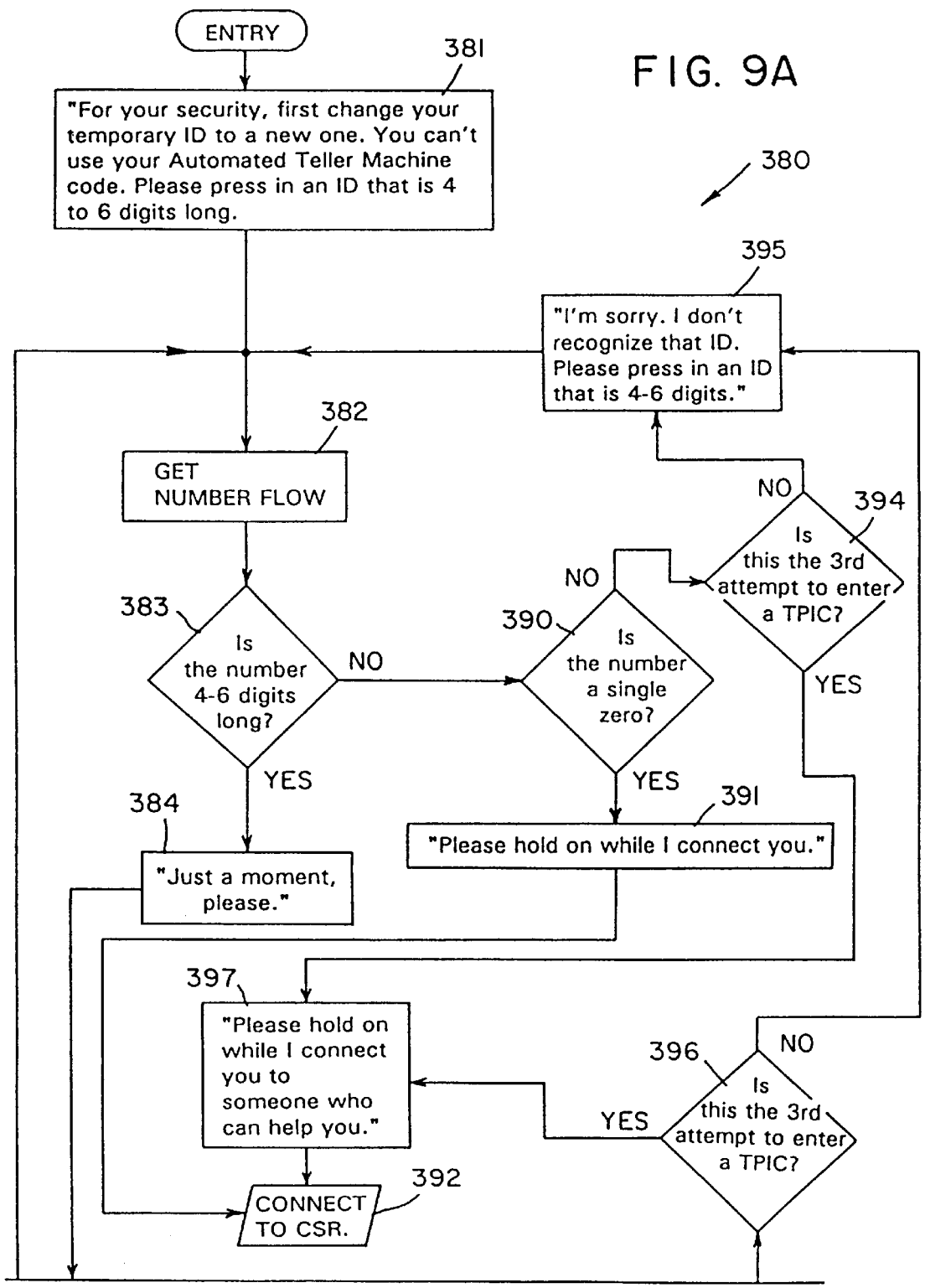
FIGS. 9A and 9B are a flow diagram illustrating in detail a particular step of FIG. 8.
Figure 9B:
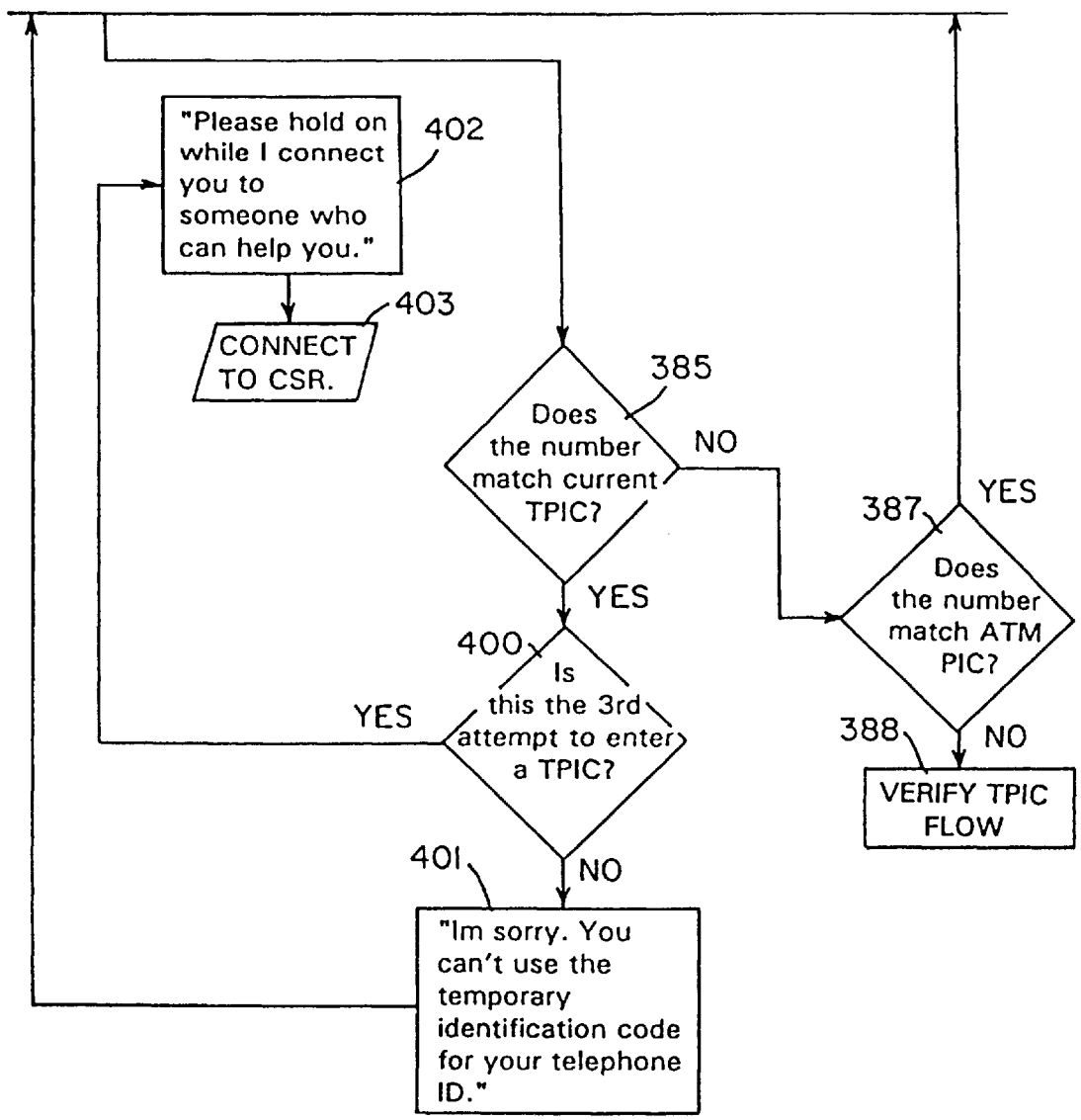

Referring to FIGS. 9A and 9B, a flow diagram 380 illustrates in detail the step 352 of FIGS. 8A and 8B where the user changes a temporary TPIC. At a first step 381, a prompt is provided to request the user to enter a new TPIC. Following the step 381 is a step 382 where the system 170 receives the number entered by the user. The step 382 is very similar to the steps 342, 313, 282, described above in connection with FIGS. 5A, 5B, 6, 7, 8A, and 8B.

Following the step 382 is a test step 383 which determines if the number entered by the user at the step 382 is between four and six digits long. If so, control passes from the step 383 to a step 384 where a prompt is provided to request the user to wait while the system 170 processes the number entered by the user.

Following the step 384 is a test step 385 which determines if the number entered by the user at the step 382 matches the current (i.e. temporary) TPIC. If not, control passes from the step 385 to a test step 387 which determines if the number entered by the user at the step 382 matches the user's ATM personal identification number. If not, control passes from the step 387 to a step 388 where the TPIC is verified. Verification of the TPIC is shown in FIG. 6 and explained in detail above.

If at the test step 383 the number entered by the user at the step 382 is not between four and six digits, control passes from the step 383 to a step 390 to determine if the number entered by the user is a single "0". If so, control passes from the test step 390 to a step 391 to provide a prompt indicating that the user will be connected to a CSR. Following the step 391, is a step 392 where the user is connected to the CSR. At this point, control of the interactive voice response system 170 ends since the user is now speaking with the CSR.

If at the test step 390 it is determined that the user has not entered a single "0", control passes form the step 390 to a test step 394 to determine if the user has made three attempts to enter a TPIC. If not, control passes from the step 394 to a step 395 where a prompt is provided requesting the user to reenter the new TPIC. Following the step 395 is the step 382, described above, where the user enters the TPIC.

If at the test step 394 it is determined that the user has attempted to enter a TPIC three times, then control passes from the step 394 to a step 397 where a prompt is provided to indicate that the user will be connected to a CSR. Following the step 397 is the step 392 where the user is connected to the CSR, as describe above.

If at the step 387 it is determined that the TPIC entered by the user matches the ATM personal identification code of the user, then control passes from the step 387 to a step 398 to determine if the user has made three attempts to enter a new TPIC. If not, then control passes from the step 398 to the step 395, which is described above. On the other hand, if at the step 398 it is determined that the user has made three attempts to enter a TPIC, then control passes from the step 398 to the steps 397, 392 where the user is connected to a CSR, as described above.

If it is determined at the step 385 that the TPIC entered by the user matches the current (i.e. temporary) TPIC, then control passes from the step 385 to a step 400 to determine if the user has made three attempts to enter a TPIC. If the user has not made three attempts to enter a TPIC, then control passes from the step 400 to a step 401 where a prompt is provided to indicate that the user cannot use the temporary identification code for the new TPIC and requesting that the user enter a different TPIC. Following the step 401 is the step 382 where the user enters a new TPIC, as described above.

If at the test step 400 the user has made three attempts to enter a TPIC, control passes from the step 400 to a step 402 where a prompt is provided indicating that the user will be connected to a CSR. Following the step 402 is a step 403 where the user is connected to the CSR. At this point, control of the interactive voice response system 170 ends since the user is now speaking with the CSR.

Entry of the CIN, SSN, TPIC, temporary TPIC, etc. shown above in connection with FIGS. 1, 2A, 2B, 3A, 3B, 4A, 4B, 5A, 5B, 6, 7, 8A, 8B, 9A, and 9B are examples of the user providing data in response to prompts from the system 170. As will be shown below, it is possible for the system 170 to provide the user with a plurality of options from which the user may choose.

Figure 10A:
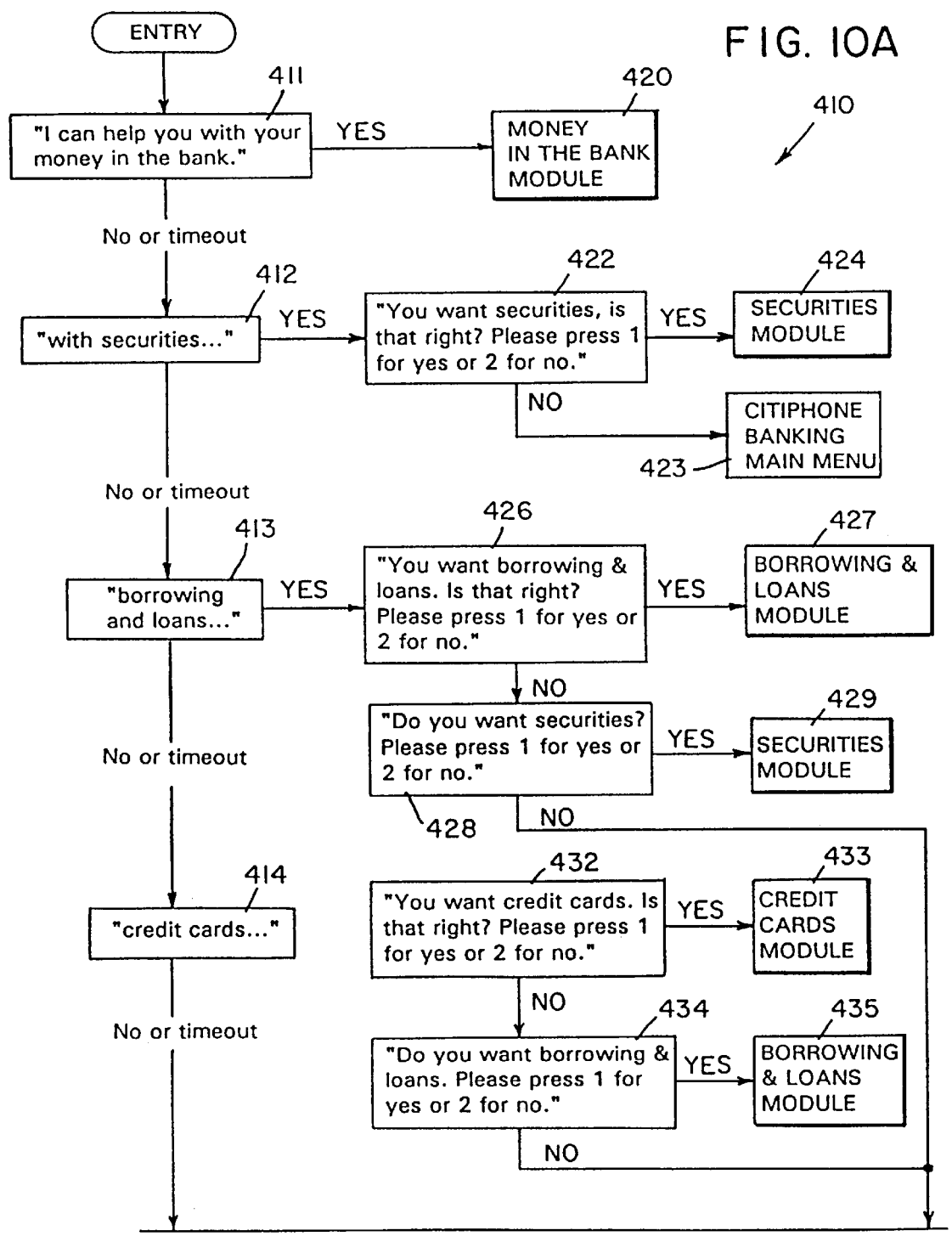
FIGS. 10A and 10B are a flow diagram illustrating in detail a particular step found in both FIG. 6 and FIG. 8.
Figure 10B:
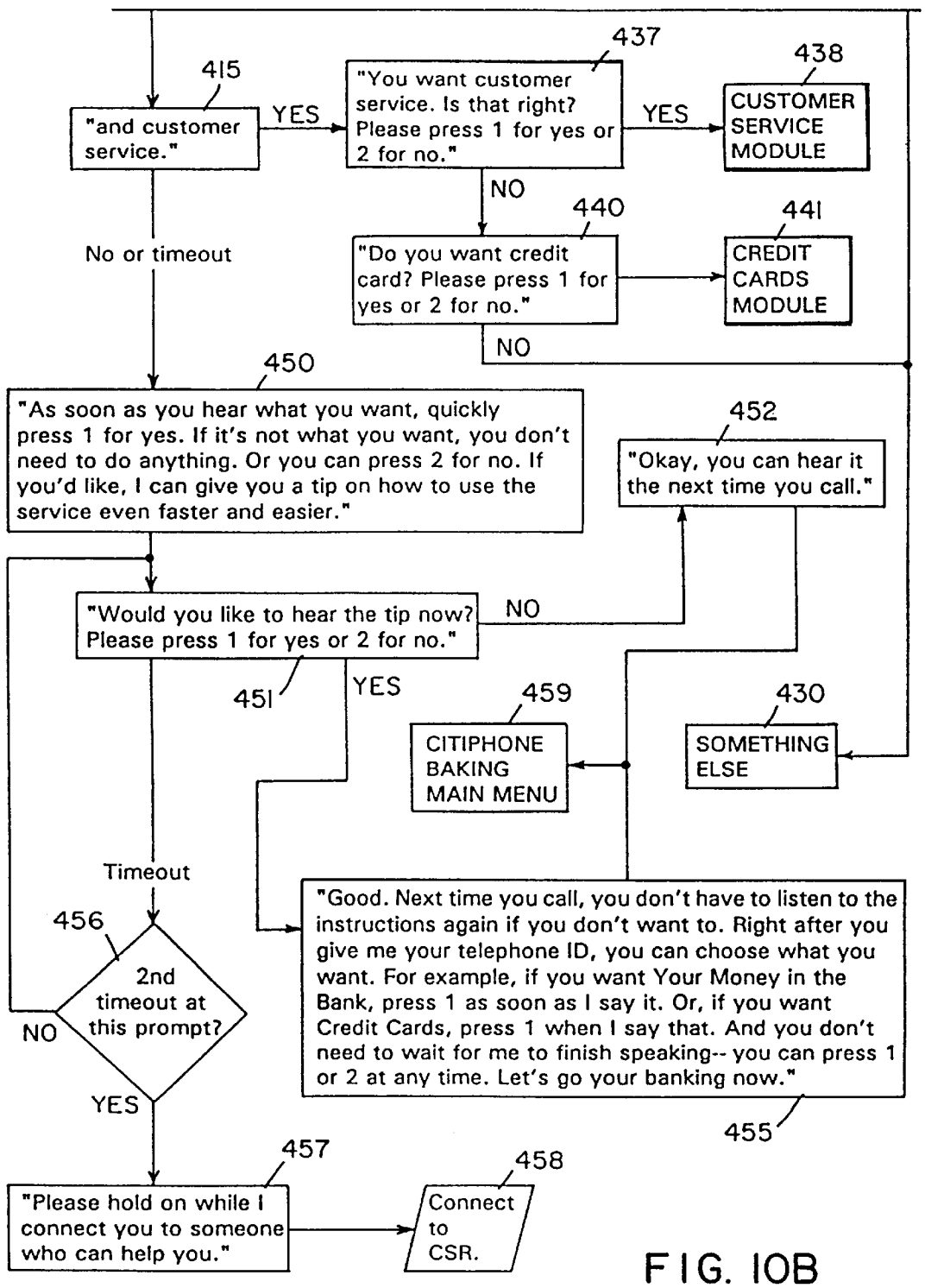

Referring to FIGS. 10A and 10B, a flow diagram 410 illustrates in detail the steps 316, 353 of FIG. 6 and FIGS. 8A and 8B, respectively, for the entry menu. The user reaches he entry menu after having successfully entered both a CIN and an associated TPIC.

At a first step 411, a prompt is provided to start a message that indicates to the user the options that are available. The options, discussed in detail below, are provided with a flat inflection (i.e. a narrative inflection where the voice is not raised in a questioning manner at the end of each option). In that way, an inexperienced user can listen to all of the options without feeling pressured to prematurely make a selection while hearing the options of the entry menu.

The prompt at the step 411 is for selecting the option relating to the user's money in the bank. The user can select this option by pressing the "YES" key ("1"). Note that this option can be selected either after the prompt is finished or at any time during the prompt.

If the user does not want the money in the bank option or if the user wishes to hear other options, the user can press the "NO" key ("2") or can not press any keys and wait for a time out of a predetermined amount of time (such as one second). In that case, control passes from the step 411 to a step 412 where a prompt is provided that continues the message from the prompt 411 and indicates that the user can be provided help with securities. If at the step 412 the user presses the "NO" key or doesn't press any keys after the predetermined amount of time required for a time out, control passes from the step 412 to a step 413.

At the step 413, a prompt is provided that continues the message from the prompt 412 and indicates that the user can receive help with borrowing and loans. If the user responds to the prompt at the step 413 by pressing the "NO" key or if the user makes no key entries after the predetermined time out required for a time out, control passes from the step 413 to a step 414.

At the step 414, a prompt is provided that continues the message from the step 413 and indicates that the user can receive help with the user's credit cards. If the user presses the "NO" key or if the user does not press any keys after the predetermined amount of time required for a time out, control passes from the step 414 to a step 415.

At the step 415, a prompt is provided that ends the message that was begun at the prompt at the step 411 and indicates that the user can be provided with customer service.

The prompts at the steps 411–415 form a single continuous message, delivered in a flat tone, that indicates to the user the available options. The user can listen to the entire message by not pressing any keys (i.e. timing out at the steps 411–414) or by responding negatively (pressing the "NO" key) at each of the options and thus hear the entire list of options available. Afterward, as described in more detail below, the user will be placed in the main menu. Alternatively, as discussed herein, the user can immediately select one of the options corresponding to the prompts 411–415 by responding affirmatively (by pressing the "YES" key) during or immediately after the one of the prompts 411–415 that corresponds to a desired option.

If at the step 411 the user presses the "YES" key ("1"), control passes from the step 411 to a step 420 where the user is transferred to the money in the bank module. The user can select this option by pressing the "YES" key any time during the prompt.

If the user presses the "YES" key at the step 412, control passes from the step 412 to a step 422 where the user is provided with a prompt to confirm that the user is interested in securities. The user can press the "YES" key any time during the prompt message at the step 412. If the user is not interested in securities, the user presses the "NO" key at the step 422 and control is transferred from the step 422 to a step 423, which corresponds to the main menu. The main menu is described in more detail hereinafter. If, on the other hand, the user in interested in securities, the user can press the "YES" key at the step 422 to be transferred to the securities module.

If the user is interested in borrowing and loans and presses the "YES" key at the step 413, control transfers from the step 413 to a step 426 where a prompt is provided requesting that the user confirm the selection of borrowing and loans. The user can press the "YES" key at any time during the prompt message at the step 413. If the user confirms the selection by pressing the "YES" key, control is transferred from the step 426 to a step 427 where the user is transferred to the borrowing and loans module. Otherwise, if the user presses the "NO" key at the prompt from the step 426, control transfers from the step 426 to a step 428 where another prompt is provided to determine if the user is interested in securities (i.e. the previous prompt from the step 412). This occurs because the user may have been late in pressing the "YES" key at the prompt 412 and thus the system 170 incorrectly interpreted the "YES" key pressed by the user as indicating a desire to access the borrowing and loans menu (i.e. the prompt from the step 413 following the prompt from the step 412).

The user can press the "YES" key at the prompt from the step 428 and control will be transferred from the step 428 to a step 429, placing the user in the securities module. Otherwise, the user can press the "NO" key at the step 428 and be transferred to a step 430 where the user is allowed to select something else. The selection of something else at the step 430 is described in more detail hereinafter.

If the user presses the "YES" to select the credit cards option at the step 414, control passes from the step 414 to a step 432 where the user is provided with a prompt to confirm selection of the credit cards option. The user can press the "YES" key at any time during the prompt message at the step 414. If the user presses the "YES" key at the step 432 to confirm selection of the credit card option, control transfers to the credit cards module 433. Otherwise, if the user presses the "NO" key at the step 432, control transfers from the step 432 to a step 434 where the user is provided with a prompt to determine if the user is interested in borrowing and loans (i.e. the previous prompt at the step 413). If the user presses the "YES" key in response to the prompt at the step 434, control is transferred from the step 434 to a step 435, placing the user in the borrowing and loans module. Otherwise, if the user presses the "NO" key at the step 434, control is transferred from the step 434 to the something else module 430.

If the user presses the "YES" key at the step 415 in order to request customer service, control passes from the step 415 to a step 437 where a prompt is provided requesting that the user confirm a desire to enter the customer service module. Note that the user can press the "YES" key at any time during the prompt message at the step 415. If the user presses the "YES" key at the step 437, control is transferred from the step 437 to a step 438 where a user enters the customer service module.

If the user presses the "NO" key at the step 437, control passes from the step 437 to a step 440 where a prompt is provided to determine if the user is interested in the credit cards module (i.e. the previous prompt at the step 414). If the user presses the "YES" key at the step 440 in order to request entry in the credit cards module, control passes from the step 440 to a step 441 where the user enters the credit cards module. Otherwise, if the user presses the "NO" key at the step 440, control passes from the step 440 to the step 430 where the user is provided with something else.

For the steps 411–415, an option is selected by providing an affirmative input (i.e. pressing the "YES" key) during or immediately after the prompt. Note that, for all of the options 411–415, the particular affirmative input ("YES" key) is constant. That is, the affirmative input for selecting one of the options 411–415 is the same for all of the options 411–415. In this way, options could be added to the system 170 without appreciably increasing the difficulty of use of the system 170 for the user.

If the user enters the module shown in FIG. 10 and answers "NO" or times out for all of the options shown at the steps 411–415, then, after the last option at the step 415, control passes from the step 415 to a step 450 where the user is provided with a help prompt to assist the user in navigating through the system 170. It is possible that the user pressed the "NO" or timed out at each of the options shown in the step 411–415 because the user did not understand how to operate the system 170. Therefore, when this occurs, the user is given the prompt shown at the step 450. The prompt 450 gives the user the option of hearing more information on how to use the system 170.

Following the step 450 is a step 451 where the user is requested to indicate a desire to hear the additional information discussed in the step 450. If the user presses the "NO" key at the step 451, control passes from the step 451 to a step 452 where a prompt is provided indicating that the user can hear the additional information the next time that the user calls. Following the step 452 is a step 453 where the user is provided with the main menu, which is described in more detail hereinafter.

If at the step 451 the user indicates a desire to hear the additional information by pressing the "YES" key at the step 451, then control is transferred from the step 451 to a step 455 where the user hears the additional information on how to use the system 170. Following the step 455 is the step 453 where the user enters the main menu, described in detail hereinafter.

If the user makes no entry at the step 451, then after a predetermined amount of time (such as one second), control is transferred from the step 451 to a test step 456 to determine if the user has timed out twice. If not, then control is transferred from the step 456 back to the step 451 where the user hears the prompt from the step 451 again. If, on the other hand, the user has timed out twice at the step 451, then control is transferred from the test step 456 to a step 457 where a prompt is provided to indicate that the user will be transferred to a CSR. Following the step 457 is a step 458 where the user is transferred to the CSR. At this point, control of the interactive voice response system ends since the user is now talking to the CSR.

Figure 11A:
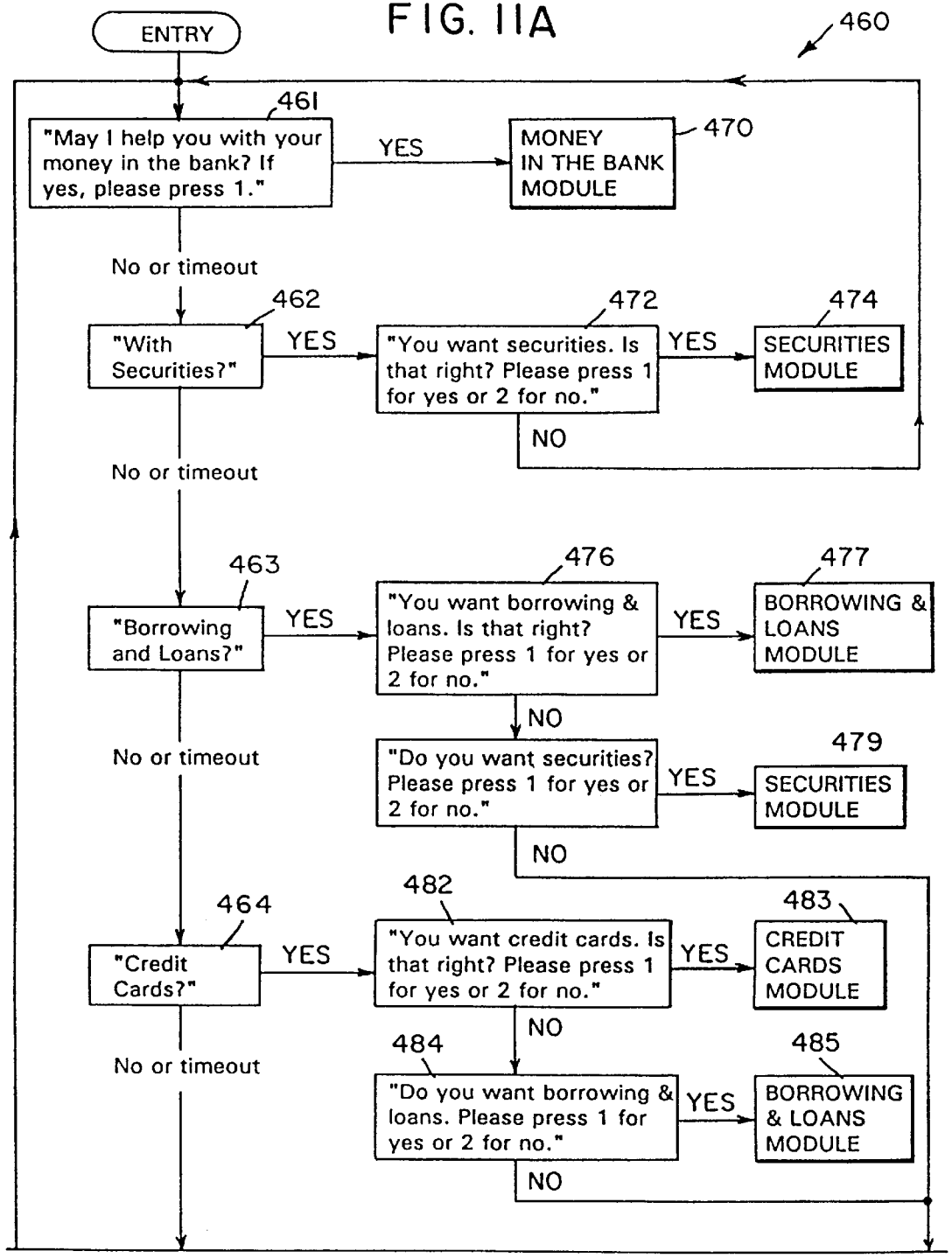
FIGS. 11A and 11B are a flow diagram illustrating in detail a particular step of FIG. 10.
Figure 11B:
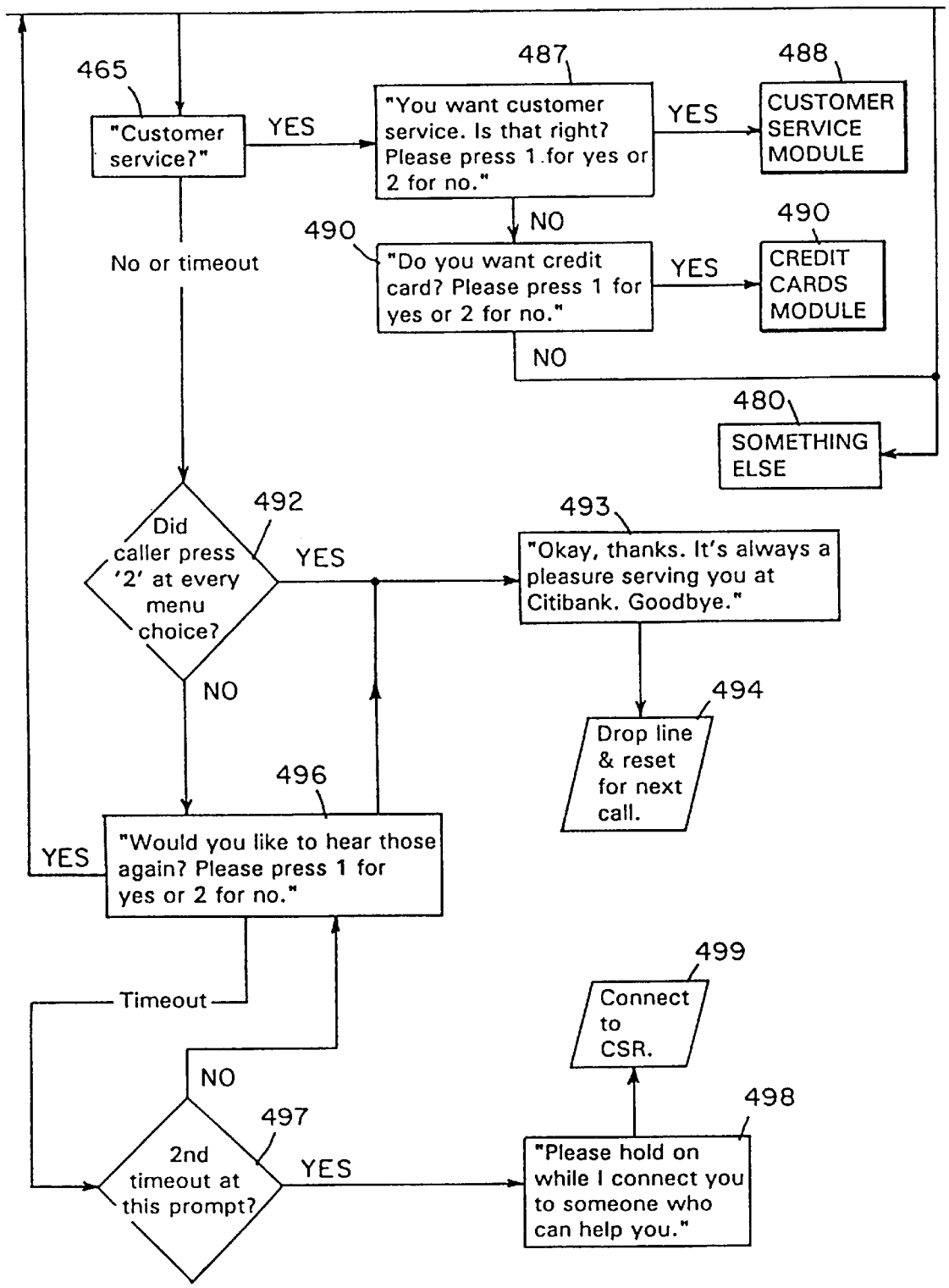

Referring to FIGS. 11A and 11B, the main menu step 453 from FIG. 10 is illustrated in detail in a flow diagram 460. At a first step 461, a prompt is provided requesting if the user needs help with the user's money in the bank. The user can select this option by pressing the "YES" key ("1"). Note that this option can be selected either after the prompt is finished or at any time during the prompt.

If the user does not want the money in the bank option, the user can press the "NO" key ("2") or can not press any keys and wait for a time out of a predetermined amount of time (such as one second). In that case, control passes from the step 461 to a step 462 where a prompt is provided to determine if the user is interested in help with securities. If at the step 462 the user presses the "NO" key or doesn't press any keys after a predetermined amount of time required for a time out (such as one second), control passes from the step 462 to a step 463.

At the step 463, a prompt is provided to determine if the user interested in help with borrowing and loans. If the user responds to the prompt at the step 463 by pressing the "NO" key or if the user doesn't press any keys after the predetermined amount of time required for a time out, control passes from the step 463 to a step 464.

At the step 464, a prompt is provided to determine if the user is interested in transactions involving the user's credit cards. If the user presses the "NO" key or if the user does not press any keys after the predetermined amount of time required for a time out, control passes from the step 464 to a step 465.

At the step 465, the user is provided with a prompt to determine if the user is interested in customer service. Note that, just as with the options for the entry menu of FIGS. 10A and 10B, the options of the main menu of FIGS. 11A and 11B are selected by providing an affirmative input (i.e. pressing the "YES" key) during or immediately after the prompt for a particular option and that the affirmative input ("YES" key) is constant for all of the options. However, unlike the entry menu of FIGS. 10A and 10B, the options for the main menu are presented to the user in an inflected tone (i.e. in a voice that is raised to form a question at the end of the each option).

If at the step 461 the user presses the "YES" key ("1"), control passes from the step 461 to a step 470 where the user is transferred to the money in the bank module. Note that the user can select this option by entering "YES" at the end of the prompt or any time during the message prompt at the step 461. The Money in the Bank Module 470 is described in more detail hereinafter in connection with FIG. 13.

If the user presses the "YES" key at the step 462, control passes from the step 462 to a step 472 where the user is provided with a prompt to confirm that the user is interested in securities. Note that the user can select this option by pressing the "YES" key at any time during the prompt at the step 462. If the user is not interested in securities, the user can press the "NO" key at the prompt at the step 472 and control is transferred from the step 472 back to the step 461, which is the entry point for the main menu. If, on the other hand, the user in interested in securities, the user can press the "YES" key at the step 472 to be transferred to the securities module.

If a user is interested in borrowing and loans and presses the "YES" key at the step 463, control transfers from the step 463 to a step 476 where a prompt is provided requesting that the user confirm the selection of borrowing and loans. Note that the user can select the option at the prompt for the step 463 by pressing the "YES" key at any time during the prompt. If the user confirms the selection by pressing the "YES" key at the step 476, control is transferred from the step 476 to a step 477 where the user is transferred to the borrowing and loans module. Otherwise, if the user presses the "NO" key at the prompt for the step 476, control is transferred from the step 476 to a step 478 where another prompt is provided to determine if the user is interested in securities (i.e. the previous prompt from the step 462). The user can press the "YES" key at the prompt for the step 478 and control is transferred from the step 478 to a step 479, placing the user in the securities module. Otherwise, the user can press the "NO" key at the prompt for the step 478 and be transferred to a step 480 where the user is allowed to select something else. The selection of something else at the step 480 is similar to the selection of something else at the step 430 of FIG. 10 and is described in more detail hereinafter.

If the user presses the "YES" key to select the credit cards option at the step 464, control passes from the step 464 to a step 482 where the user is provided with a prompt to confirm selection of the credit cards option. Note that the user can select the credit cards option by pressing the "YES" key at any time during the message for the prompt at the step 464. If the user presses the "YES" key at the step 482, control transfers to the credit cards module at the step 483. Otherwise, if the user presses the "NO" key at the step 482, control transfers to a step 484 where the user is provided with a prompt to determine if the user is interested in borrowing and loans (i.e. the prompt from the last step 463). If the user presses the "YES" key in response to the prompt at the step 484, control is transferred from the step 484 to a step 485, placing the user in the borrowing and loans module. Otherwise, if the user presses the "NO" key at the step 484, control is transferred from the step 484 to the something else module at the step 480.

If the user presses the "YES" key at the step 465 in order to request customer service, control passes from the step 465 to a step 487 where a prompt is provided requesting that the user confirm a desire to enter the customer service module. Note that at the step 465, the user can press the "YES" key at any time during the message provided at the step 465. If the user presses the "YES" key at the step 487, control is transferred from the step 487 to a step 488 where the user enters the customer service module.

If the user does not confirm a desire to enter the customer service module by pressing the "NO" key at the step 487, control is transferred from the step 487 to a step 490 where a prompt is provided to determine if the user is interested in the credit cards module (i.e. the prompt from the previous step 464). If the user presses the "YES" key at the step 490 in order to request entry in the credit cards module, control passes from the step 490 to a step 491 where the user enters the credit cards module. Otherwise, if the user presses the "NO" key at the step 490, control passes from the step 490 to the step 480 where the user is provided with the something else option.

If the user presses the "NO" key or times out at all of the steps 461–465 of the main menu, control is transferred from the last step 465 to a step 492 to determine if the user entered the "NO" key ("2") at every menu choice. If so, control is transferred from the step 492 to a step 493 where a prompt is provided indicating to the user that the system 170 will terminate the user's call. Following the step 493 is a step 494 where the system terminates the users call by dropping the line and resetting the system 170 for the next call. Execution of the step 494 terminates processing of the system 170 for the user.

If at the step 492 the user has not entered a "NO" key ("2") at all of the menu choices, then control is transferred from the step 492 to a step 496 where a prompt is provided to determine if the user desires to hear the menu choices again. If the user enters a "YES" key at the step 496, then control is transferred from the step 496 to the step 461 (the main menu entry point) so that the user can hear the menu choices again. Otherwise, if the user enters the "NO" key at the step 496, control is transferred from the step 496 to the steps 493, 494 where a prompt is provided to indicate that the call will be terminated and then the call is terminated as discussed above.

If the user makes no entry at the step 496, then after a predetermined amount of time (such as one second), control is transferred from the step 496 to a test step 497 to determine if the user has timed out from the prompt at the step 496 twice. If not, then control is transferred from the step 497 back to the step 496 and the user hears the prompt from the step 496 again. If, on the other hand, the user has timed out from twice the prompt step 496, then control is transferred from the test step 497 to a step 498 where a prompt is provided to indicate that the user will be connected to a CSR. Following the step 498 is a step 499 where the user is connected to the CSR. At this point, control of the interactive voice response system 170 ends, since the user is now talking to the CSR.

Figure 12:
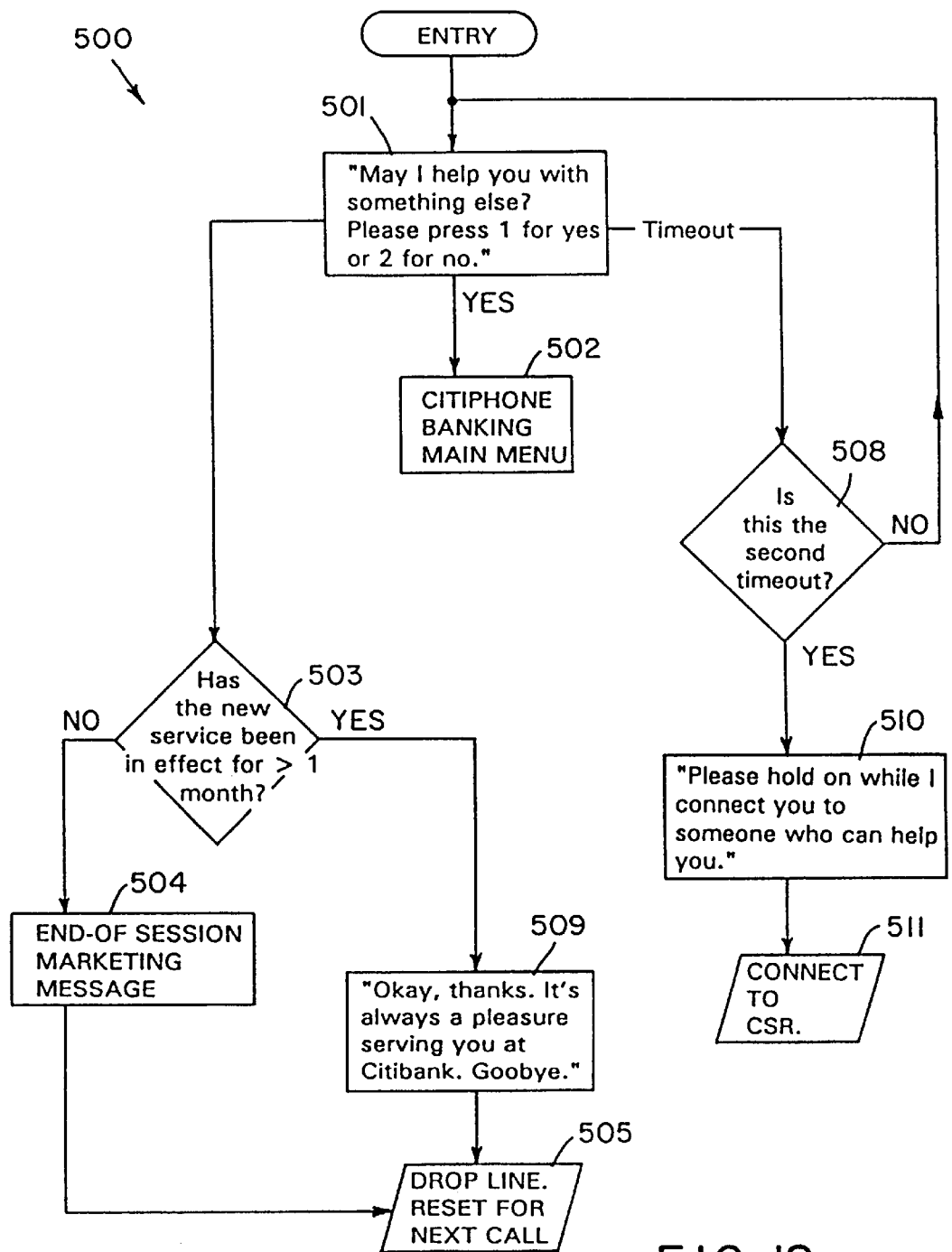
FIG. 12 is a flow diagram illustrating in detail a particular step found in both FIG. 10 and FIG. 11.

Referring to FIG. 12, a flow diagram 500 shows in detail the something else step 430 of FIGS. 10A and 10B and the something else step 480 of FIGS. 11A and 11B. At a first step 501, a prompt is provided requesting the user to indicate a desire to be helped with something else. If the user presses the "YES" key at the step 501, control is transferred from the step 501 to a step 502 which corresponds to the main menu shown in FIGS. 11A and 11B.

If at the step 501 the user presses the "NO" key, control is transferred from the step 501 to a test step 503 to determine if the user has had an account on the system 170 for greater than one month. If not, control is transferred from the step 503 to a step 504 where the user is provided with a marketing message. Following the step 504 is a step 505 where the system 170 terminates the user's call and prepares for a next call.

If it is determined at the step 503 that the user has been using the service for greater than one month, then control is transferred from the step 503 to a step 507 where a prompt is provided indicating that the user's call will be terminated. Following the step 507 is the step 505 where the system 170 terminates the user's call.

If the user makes no response to the prompt at the step 501 after a predetermined amount of time (such as one second), then control is transferred from the step 501 to a step 509 to determine if the user has timed-out twice from the step 501. If not, then control is transferred from the step 509 back to the step 501 to repeat the prompt at the step 501. Otherwise, if the user has timed out twice, then control is transferred from the step 509 to a step 510 where a prompt is provided to indicate that the user will be connected to a CSR. Following the step 510 is a step 511 where the user is connected to the CSR. At this point, control of the interactive voice response system 170 ends since the user is now speaking with the CSR.

Figure 13:
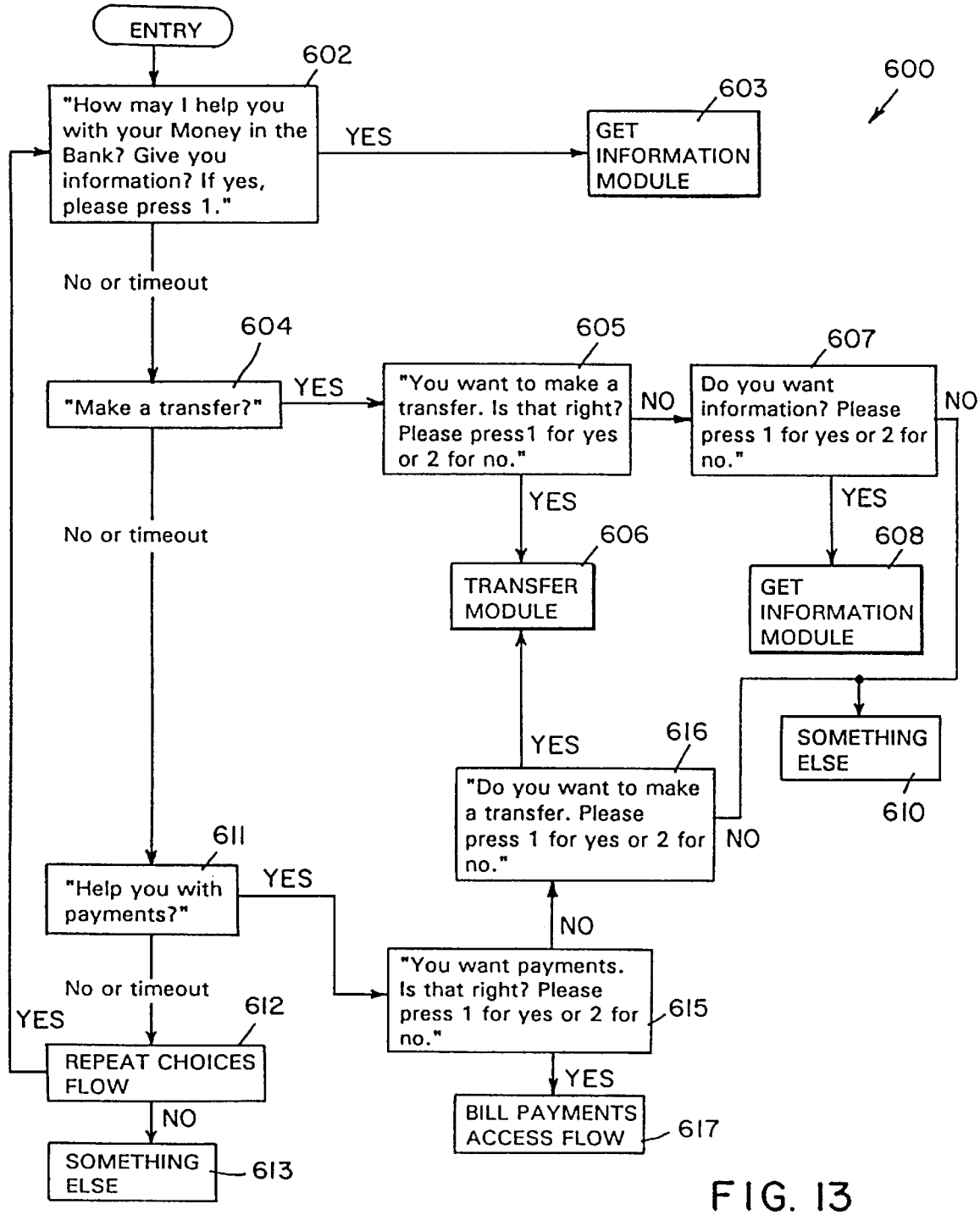
FIG. 13 is a flow diagram illustrating a money in the bank module.

Referring to FIG. 13, a flow diagram 600 illustrates in detail the Money in the Bank Module 470 of FIG. 11. At a first step 602, the user is provided with a prompt to determine if the user requires information. If the user enters the "YES" key ("1") at the step 602, then control is transferred from the prompt step 602 to a step 603 where the user is given additional information.

If at the step 602 the user enters the "NO" key ("2") or times out, then control transfers from the step 602 to a step 604 where the user is provided with a prompt to determine if the user wishes to make a transfer. The user indicates a desire to make a transfer by pressing the "YES" key ("1") at the step 604, thus transferring control to a step 605 to confirm that the user wishes to make a transfer. If the user confirms a desire to make a transfer by pressing the "YES" key at the step 605, control transfers from the step 605 to a step 606 where the user enters a transfer module. Otherwise, if the user enters the "NO" key at the step 605, then control transfers from the step 605 to a step 607 where the user is provided with a prompt to determine if the user requires information. If the user responds to the prompt at the step 607 by pressing the "YES" key, then control transfers from the step 607 to a step 608 where the user enters the information module. If, on the other hand, the user presses the "NO" key at the prompt step 607, then control transfers from the step 607 to a step 610 where the user enters the something else module. The something else module is described in more detail elsewhere herein.

If at the step 604 the user responds to the prompt by pressing the "NO" key or by timing out, then control transfers from the step 604 to a prompt step 611 to determine if the user desires help with payments. If the user responds to the prompt at the step 611 by pressing the "NO" key or by timing out, then control transfers from the step 611 to a step 612 where the user enters the repeat choices flow. The repeat choices flow determines if the user desires to repeat the choices shown at the steps 602, 604, 611.

If the user presses the "NO" key at the step 612, control transfers from the step 612 to a step 613 where the user goes to something else, which is described elsewhere herein. Otherwise, if the user presses the "YES" key at the step 612, control transfers from the step 612 back to the step 602 to repeat the menu entry choices.

If at the prompt step 611 the user indicates a desire to enter the payments module by pressing the "YES" key, control transfers from the step 611 to a step 615 where a prompt is provided requesting that the user confirm the choice to enter the payments module. If at the step 615 the user does not confirm the choice to enter the payments module (by pressing the "NO" key), then control transfers from the step 615 to a step 616 where a prompt is provided to determine if the user would like to make a transfer. If the user responds to the prompt at the step 616 by pressing the "YES" key, then control transfers from the step 616 to the step 606, described above. If, on the other hand, the user presses the "NO" key at the step 616, then control transfers from the step 616 to the step 610, described above.

If at the prompt step 615 the user confirms the choice to enter the payments module by pressing the "YES" key, then control transfers from the step 615 to a step 617 where the user enters the bill payments access module. The bill payments access module is described in more detail hereinafter.

Figure 14:
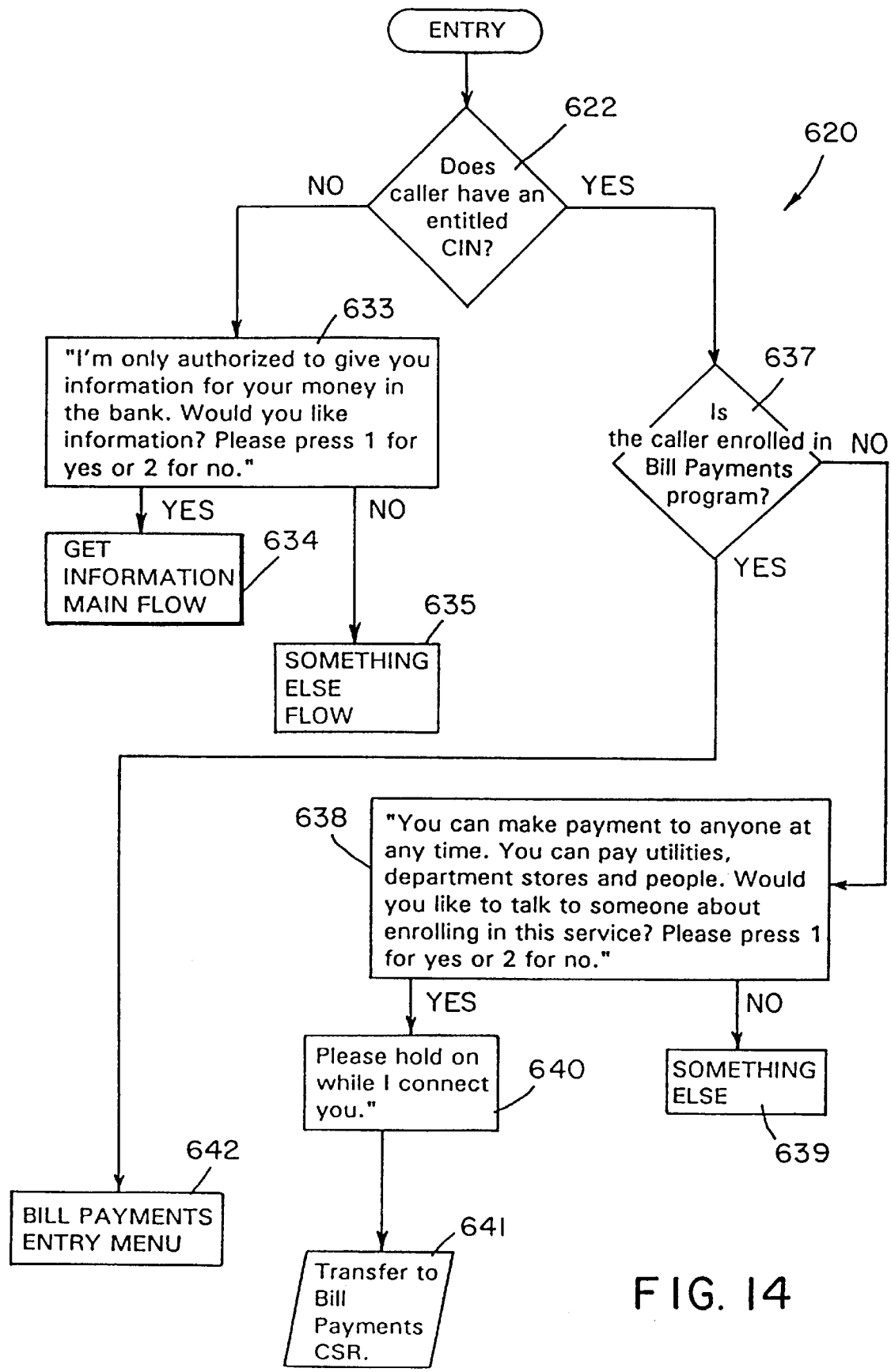
FIG. 14 is a flow diagram illustrating a bill payment access module.

Referring to FIG. 14, a flow diagram 620 illustrates in detail operation of a bill payment access module. Processing begins at a first step 622 which determines if the user has an entitled CIN. If the user does not have an entitled CIN (i.e., a CIN that allows the user access to the bill payment system) then control passes from the step 622 to a step 633 where the user is provided with a prompt to determine if the user is interested in receiving additional information. If the user responds to the prompt by pressing the "YES" key at the step 633, control passes from the step 633 to a step 634 where the user enters the get information module. Otherwise, the user can press the "NO" key at the step 633 and enter the something else flow at a step 635.

If at the test step 622 it is determined that the user has an entitled CIN, then control passes from the step 622 to a step 637 to determine if the user is enrolled in the bill payment program. Enrolling in the bill payment program requires the user to send in an executed form authorizing automatic bill payment. After receiving authorization for a user, an operator modifies the system (using conventional means) to indicate that the user is enrolled in the bill payment program.

If the user is not enrolled in the bill payment program, control passes from the test step 637 to a step 638 where the user is provided with information about the bill payment program and is prompted to determine if the user would like to enroll in the bill payment program. If the user presses the "NO" key at the prompt, then control passes from the step 638 to a step 639 where the user enters the something else flow.

If the user presses the "YES" key at the prompt step 638, thus indicating a desire to enroll in the bill payment program, control passes from the step 638 to a step 640 where a prompt is provided to indicate that the user will be transferred to a CSR. Following the step 640 is a step 641 where the user is transferred to the CSR, who will explain the bill payment program to the user and offer to send the user an authorization form. At this point, control of the interactive voice response system 170 ends since the user is now talking to the CSR.

If at the test step 637 it is determined that the user is enrolled in the bill payment program, control transfers from the step 637 to a step 642 where the user is transferred to the bill payments entry menu, described in more detail hereinafter.

Figure 15B:
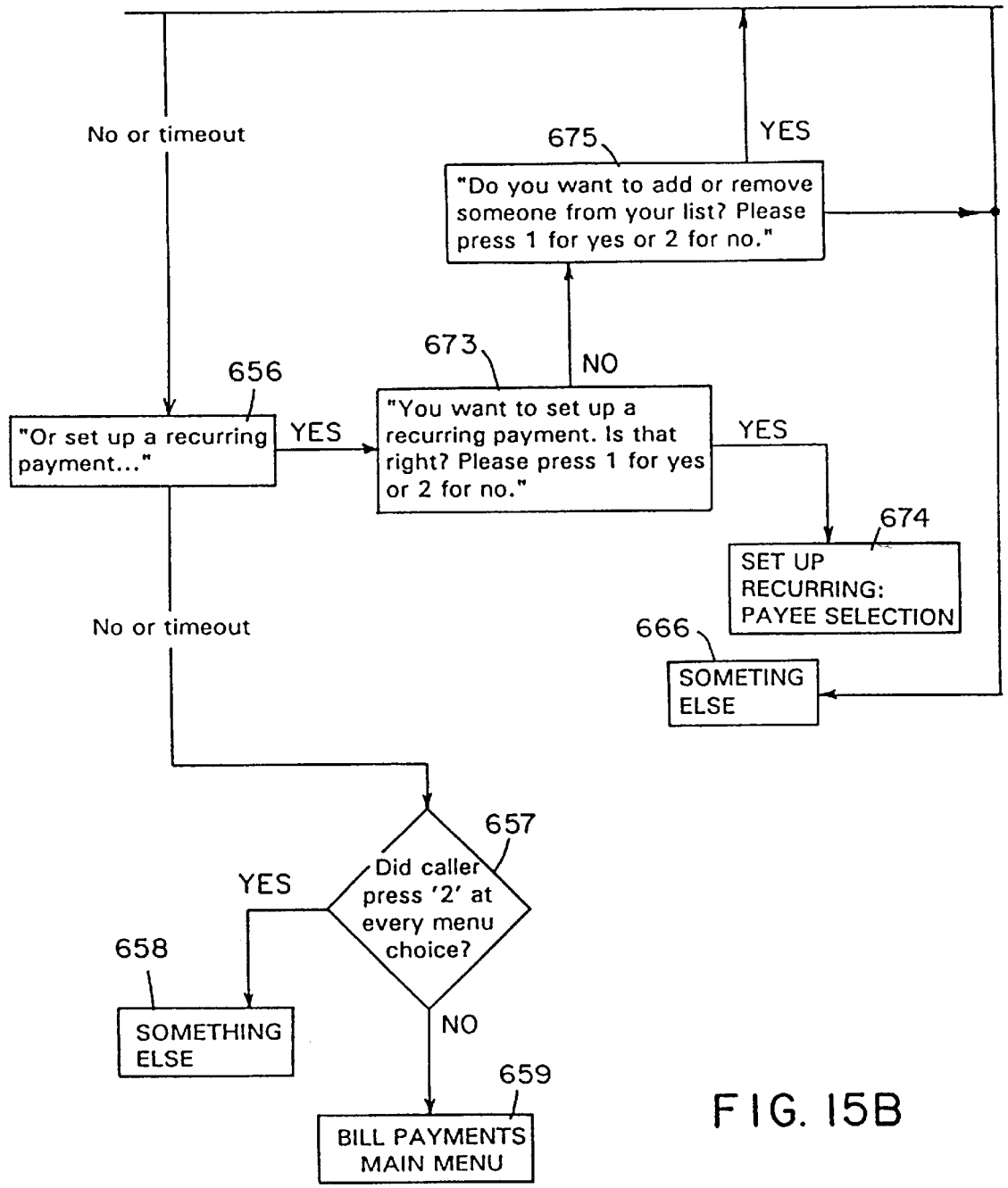

Referring to FIGS. 15A and 15B, a flow diagram 650 illustrates the bill payments entry menu. At a first step 652, the user is provided with a prompt to determine if the user needs help with making a payment. If the user responds to the prompt at the step 652 by pressing the "NO" key or by timing out, control passes from the step 652 to a step 653 where the user is provided with a prompt to determine if the user wants to get payment information. If the user responds to the prompt at the step 653 by pressing the "NO" key or by timing out, then control passes from the step 653 to a step 654 where a prompt is provided to determine if the user wants to cancel or change a payment.

If the user responds to the prompt at the step 654 by pressing the "NO" key or by timing out, then control passes from the step 654 to a step 655 where a prompt is provided to determine if the user wants to add or remove someone from the user's payment list. If the user responds to the prompt at the step 655 by pressing the "NO" key or by timing out, then control passes from the step 655 to a step 656 where a prompt is provided to determine if the user wishes to set up a recurring payment. If the user responds to the prompt at the step 656 by pressing the "NO" key or by timing out, then control passes from the step 656 to a test step 657.

At the test step 657, it is determined if the user pressed the "2" key (i.e., the "NO" key) at every prompt corresponding to the steps 652–656 (i.e., if the user did not time out at any of the steps 652–656). If so, then control passes from the step 657 to a step 658 where the user enters the something else module, described elsewhere herein. Otherwise, control passes from the step 657 to a step 659 Where the user enters the bill payments main menu.

If at the step 652 the user presses the "YES" key, then control passes from the step 652 to a step 660 where the user enters the payee selection module. The payee selection module is described in more detail hereinafter.

If at the step 653, the user presses the "YES" key, then control passes from the step 653 to a step 661 where the user confirms selection of the option presented at the prompt step 653. The user confirms the selection by pressing the "YES" key at the step 661, thus transferring control from the step 661 to a step 662 where the user enters the payment information module. If, on the other hand, the user responds to the confirmation prompt at the step 661 by pressing the "NO" key, then control passes from the step 661 to a step 663 where a prompt is provided to determine if the user desires the option presented at the previous prompt (i.e., the prompt presented at the step 652). If the user presses the "YES" key at the step 662, then control transfers from the step 663. to the step 660 where the user enters the payee selection module. Otherwise, if the user presses the "NO" key at the step 663, then control transfers from the step 663 to a step 665 where the user is provided with something else, described elsewhere herein.

If at the prompt step 654 the user presses the "YES" key, then control transfers from the step 654 to a step 667 where the user is provided with a prompt to confirm selection of the item at the step 654 (i.e., change or cancel a payment). The user can confirm the selection by pressing the "YES" key at the step 667 and be transferred to the change or cancel flow at the step 668. Otherwise, if the user presses the "NO" key at the step 667, then control transfers from the step 667 to a step 669 where a prompt is provided to determine if the user is requesting the item presented at the pervious entry menu prompt (i.e., the get payment information prompt at the step 653). If the user responds to the prompt at the step 669 by pressing the "NO" key, then control transfers from the step 669 to the something else step 665. Otherwise, if the user presses the "YES" key at the step 669, then control transfers from the step 669 to the payment info step 662.

If at the prompt step 655 the user presses the "YES" key, then control transfers from the step 655 to a step 670 where the user is provided with a prompt to confirm selection of the item at the step 655 (i.e., add or remove someone from the payment list). The user can confirm the selection by pressing the "YES" key at the step 670 to transfer control from the step 670 to a step 671 where the user enters the add/remove module. Otherwise, if the user presses the "NO" key at the step 670, then control transfers from the step 670 to a step. 672 where a prompt is provided to determine if the user is requesting the item presented at the previous menu prompt (i.e., the change or cancel payment prompt at the step 654). If the user responds to the prompt at the step 672 by pressing the "NO" key, then control transfers from the step 672 to the something else step 665. Otherwise, if the user presses the "YES" key at the step 672, then control transfers from the step 672 to the change or cancel step 668.

If at the prompt step 656 the user presses the "YES" key, then control transfers from the step 656 to a step 673 where the user is provided with a prompt to confirm selection of the item at the step 656 (i.e., setting up a recurrent payment). The user can confirm the selection by pressing the "YES" key at the step 673, thus transferring control to the set up recurring payee selection module at a step 674. Otherwise, if the user presses the "NO" key at the step 673, then control transfers from the step 673 to a step 675 where a prompt is provided to determine if the user is requesting the item presented at the previous entry menu prompt (i.e., the add or remove someone from the list prompt at the step 655). If the user responds to the prompt at the step 675 by pressing the "NO" key, then control transfers from the step 675 to the something else step 665. Otherwise, if the user presses the "YES" key at the step 675, then control transfers from the step 675 to the add/remove step 671.

Figure 16A:
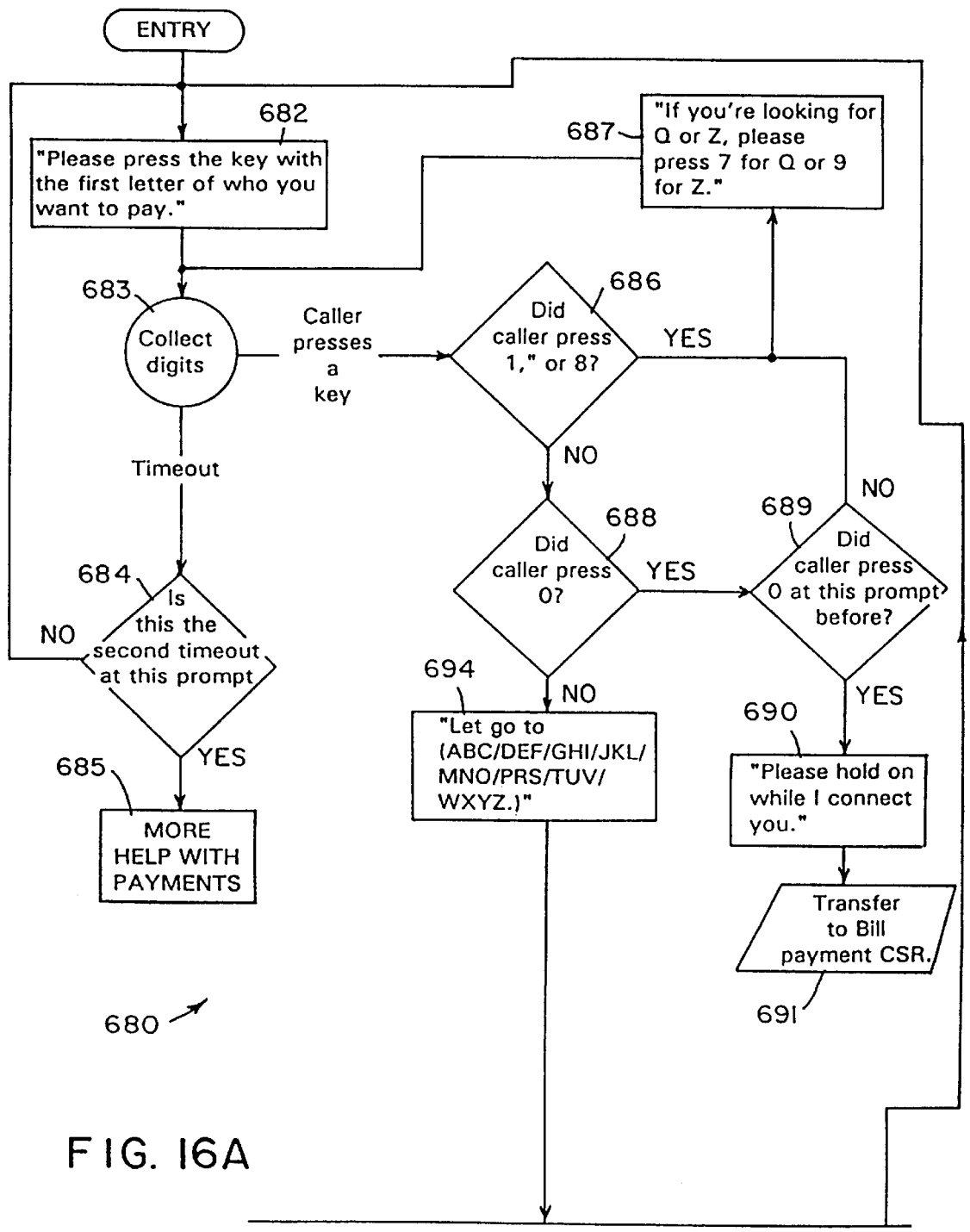
FIGS. 16A and 16B are a flow diagram illustrating a making a payment, payee selection module.
Figure 16B:
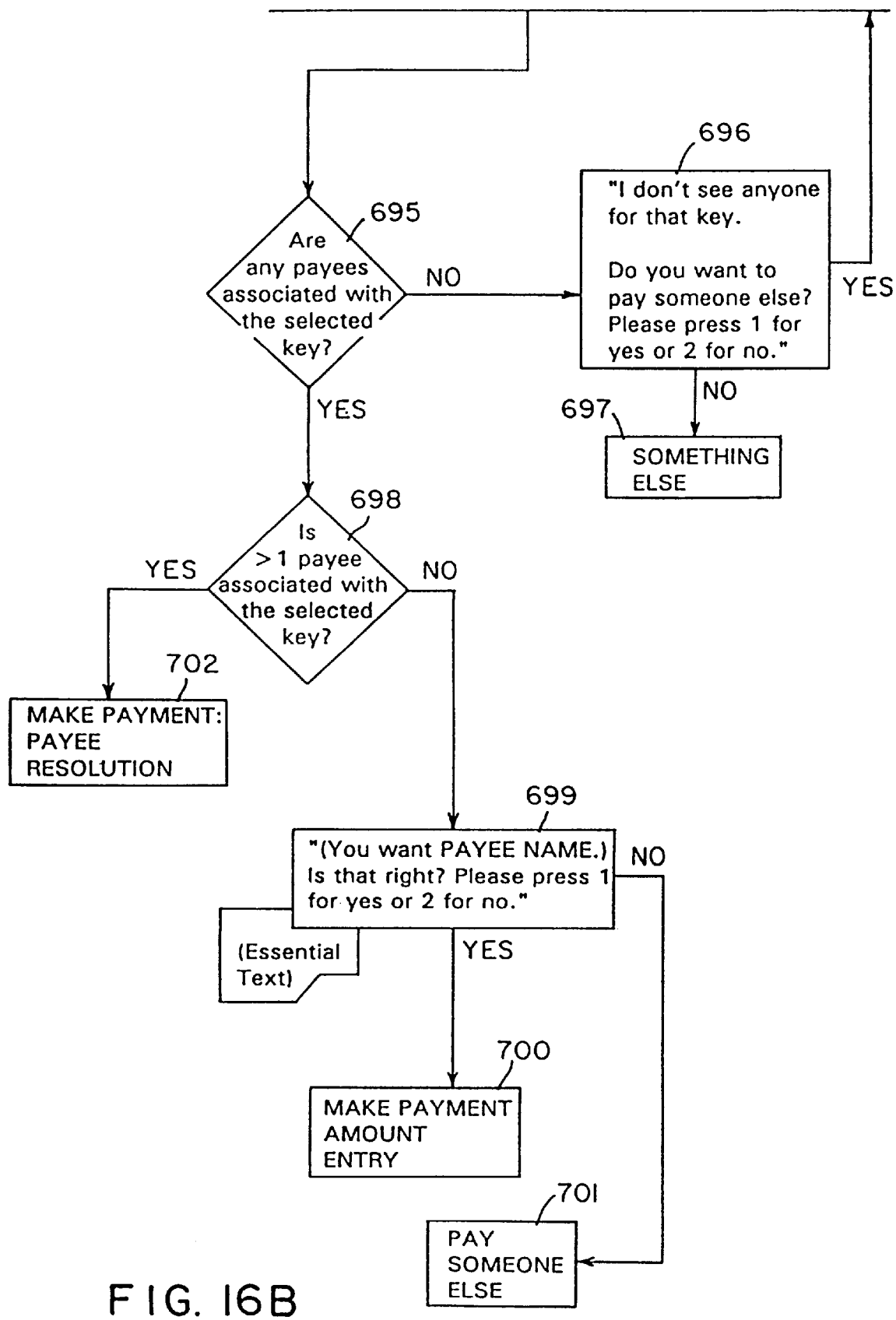

Referring to FIGS. 16A and 16B, a flow diagram 680 illustrates in detail the payee selection step 660 of FIGS. 15A and 15B. Processing begins at a first step 682 where the user is provided with a prompt requesting entry of a digit on the telephone corresponding to the first letter of the name of the payee. Most touch-tone telephones have numbered buttons with letters associated therewith so that, for example, the number "2" button is associated with the letters "A", "B", and "C" and the number "3" button is associated with the letters "D", "E", and "F", etc. The prompt at the step 682 requests a user to press a numbered button having a letter associated therewith corresponding to the first letter of the name of the payee. For example, if the name of the payee is "Macy's", then the user would press the "6" button since the "6" button has the letter "M" (along with the letters "N" and "O") associated therewith.

Note that although an embodiment illustrated herein uses the first letter of the name of the payee, it is possible to use the second, third, or any other letter position in the name of the payee, so that in other embodiments, for example, the user could be prompted to press a numbered button corresponding to the last letter of the name of the payee. The user could also be prompted to provide more than one letter corresponding to the name of the payee. Furthermore, although an embodiment illustrated herein uses a touch-tone telephone, it is possible to have the system 170 respond to the user speaking the letter or letters corresponding to the name of the payee instead of pressing touch-tone telephone buttons.

Following the prompt step 682 is a step 683 where the digits entered by the user are collected. Collecting digits is described elsewhere herein (see, for example, the discussion corresponding to the step 331 of FIG. 7). Note that, for the prompt at the step 682, the collect digits step 683 only collects a single digit.

If at the step 683 the user times out, then control transfers from the step 683 to a step 684 which determines if the user has timed out twice from the collect digits step 683. If the user has not timed out twice from the collect digits step 683, then control transfers from the step 684 back to the step 682 to provide the user with the prompt at the step 682, discussed above. Otherwise, if the user has timed out twice from the collect digits step 683, then control transfers from the step 684 to a step 685 where the user is provided with more help with payments.

If the user presses a key at the step 683, then control transfers from the step 683 to a step 686 to determine if the user has pressed a "1" key or a "#" key. If the user pressed a "1" or a "#" key at the step 683, then control transfers from the step 686 to a step 687 where the user is provided with a prompt indicating that the user can press the "7" key for the letter "Q" or can press the "9" key for "Z". Note that on a touch tone telephone, the letters "Q" and "Z" are normally not associated with any of the numbered buttons. Following the step 687, control transfers back to the step 683 to provide the user with another opportunity to press a button to indicate the first letter of the payee.

If it is determined at the step 686 that the user did not press the "1" key or the "#" key at the step 683, then control transfers from the step 686 to a step 688 which determines if the user pressed the "0" key. If the user pressed the "0" key at the step 683, then control transfers from the step 688 to a test step 689 to determine if the user had previously pressed the "0" key at the step 683. If not, then control transfers from the step 689 back to the step 687, described above. Otherwise, if the user had pressed the "0" key at the step 683 more than once, then control transfers from the step 689 to a step 690 where a prompt is provided to indicate that the user will be connected to a CSR. Following the step 690 is a step 691 where the user is connected to the CSR. At this point, control of the interactive voice response system 170 ends since the user is now speaking with the CSR.

If it is determined at the step 686 that the user did not enter the "1" key or the "#" key and if it is determined at the step 688 that the user did not press the "0" key, then control transfers from the step 688 to a step 694 where the user is provided with a prompt indicating the letters associated with this selected key. For example, if the user pressed the "3" key at the step 683, then the prompt at the step 694 would state "let's go to D,E,F". Similarly, if the user had pressed the "7" key, then the prompt at the step 694 would state "let's go to P,Q,R,S". The prompt at the step 694 indicates to the user the letters associated with the button pressed by the user at the step 683.

Following the step 694 is a test step 695 which determines if any payees are associated with the key selected by the user (i.e., determines whether any payees begin with a letter corresponding to the number key pressed by the user at the step 683). If not, then control transfers from the step 695 to a step 696 where the user is provided with a prompt indicating that there are no payees associated with the number key pressed by the user and requesting if the user would like to pay someone else. If the user responds to the prompt at the step 696 by pressing the "NO" key, then control transfers from the step 696 to a step 697 where the user is provided with something else, described elsewhere herein. Otherwise, if the user presses the "YES" key at the step 696, then control transfers from the step 696 back to the step 682 where the user is provided with the prompt for entering the key having the first letter of the name of the payee, as discussed above.

If it is determined at the step 695 that there is at least one payee associated with the button pressed by the user at the step 683, then control transfers from the step 695 to a test step 698 to determine if there is more than one payee associated with the selected key. If there is only one payee associated with the selected key, control transfers from the step 698 to a step 699 where a prompt is provided to request that the user confirm selection of the single payee. If the user confirms the selection at the step 699 by pressing the "YES" key, then control transfers from the step 699 to a step 700 where the user enters the amount of the payment. Otherwise, if the user presses the "NO" key at the step 699, then control transfers from the step 699 to a step 701 where the user pays someone else other than the selected payee. Note that the key for confirming a payee (the "YES" or the "1" key) is constant for any selected payee and that the key for rejecting a payee (the "NO" key or the "2" key) is also constant for any selected payee.

If at the step 698 it is determined that there is more than one payee associated with the key pressed by the user at the step 683, then control transfers from the step 698 to a step 702 where the user resolves the multiple payees that are associated with the key pressed by the user. Resolution of multiple payees is described in more detail hereinafter.

Figure 17A:
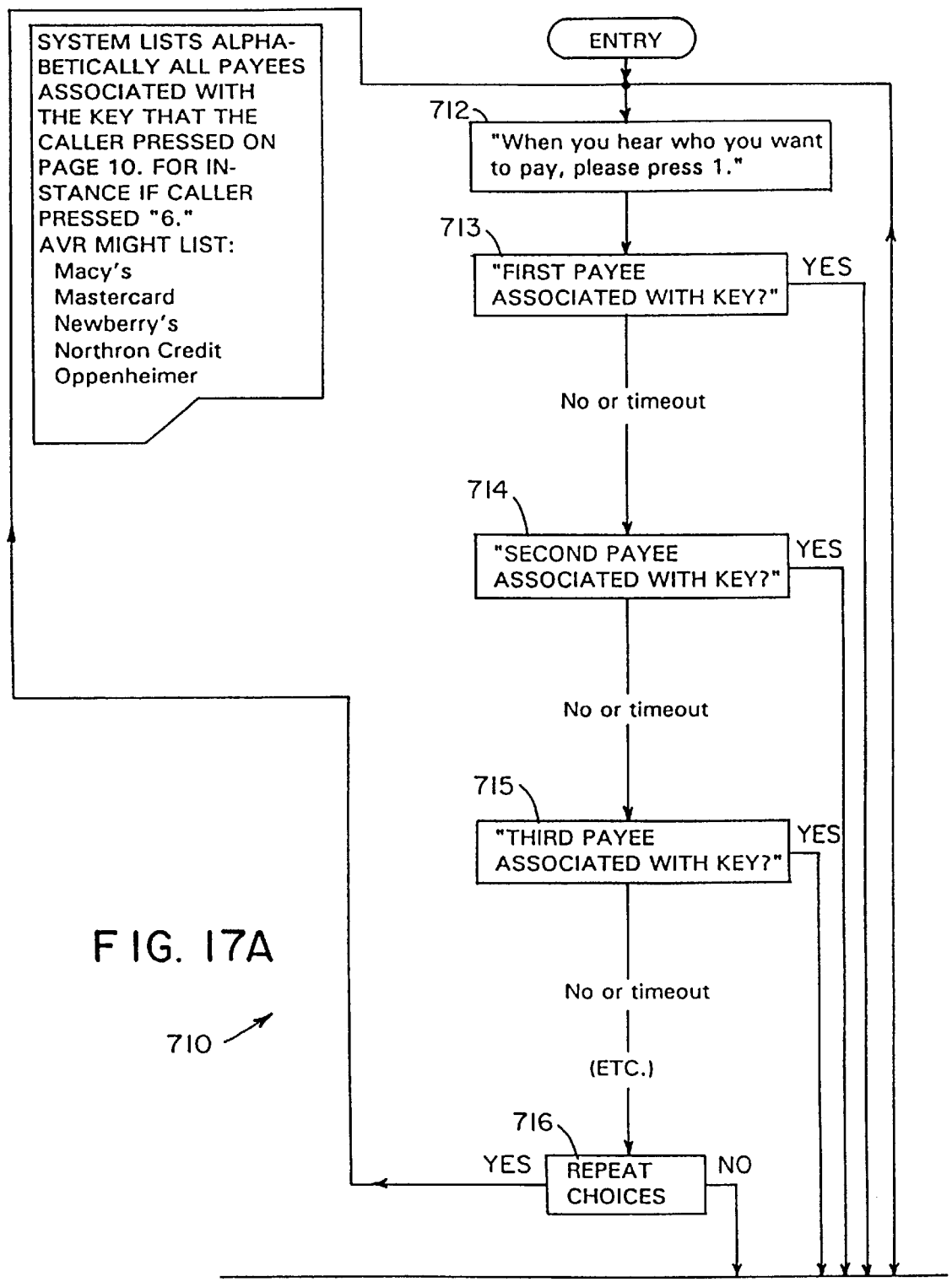
FIGS. 17A, 17B, and 17C are a flow diagram illustrating a making a payment, payee resolution module.
Figure 17B:
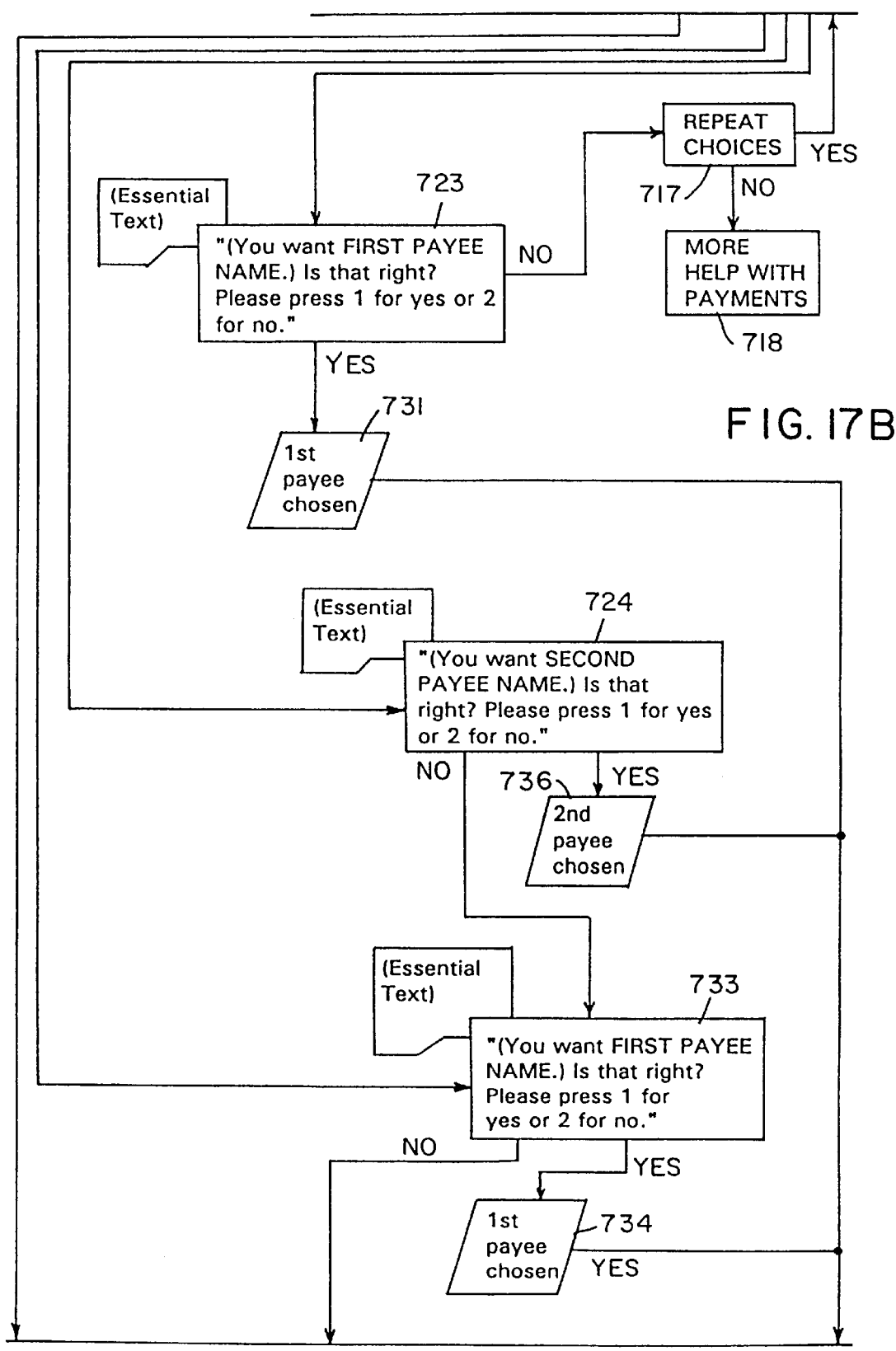
Figure 17C:
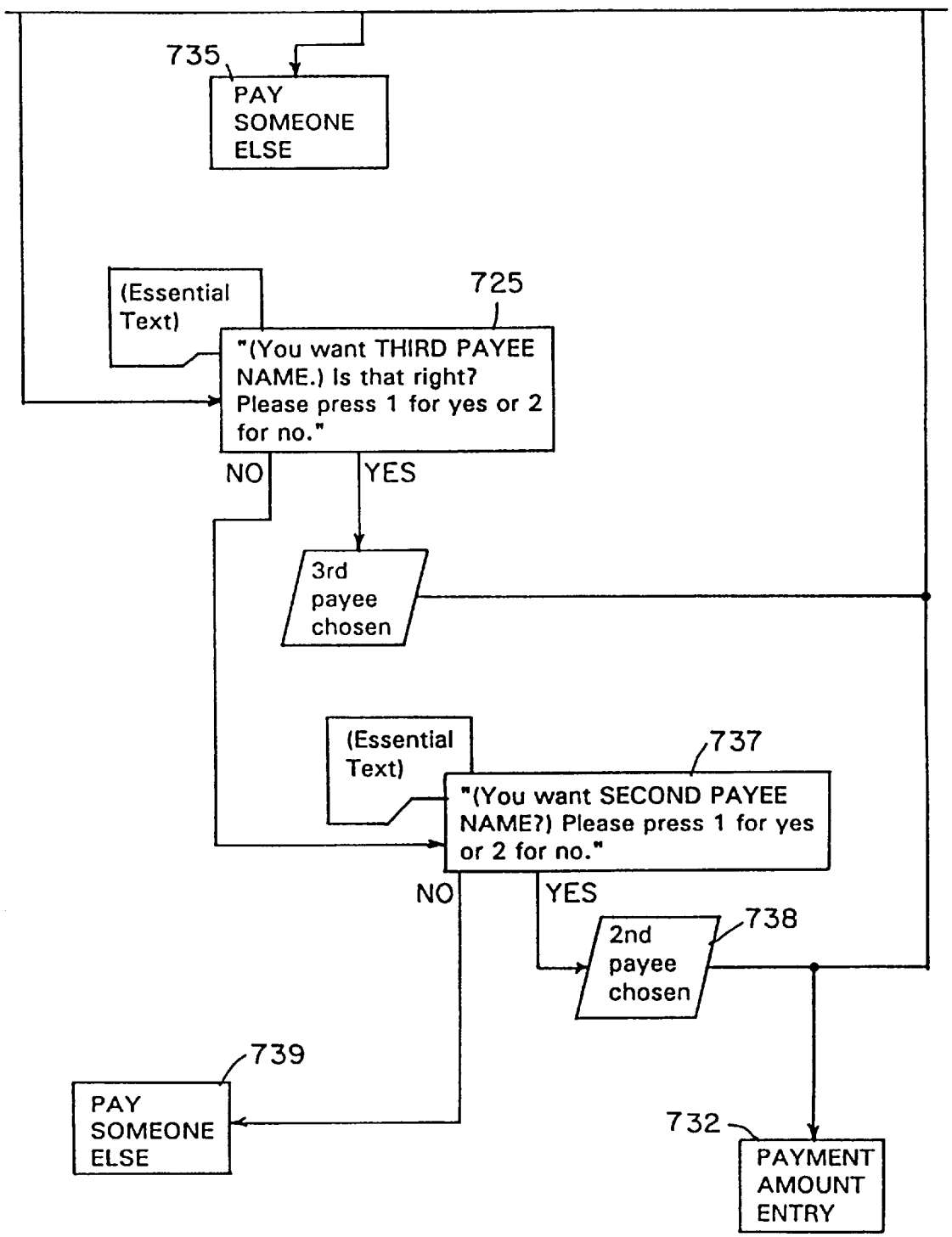

Referring to FIGS. 17A, 17B, and 17C, a flow diagram 710 illustrates in detail the payee resolution step 702 of FIGS. 16A and 16B. As described above, payee resolution is necessary whenever more than one payee is associated with a key pressed by the user.

At a first step 712, the user is provided with a prompt to indicate that the user should press the "YES" key (i.e., the "1" button on the touch tone phone) when the user hears the name of the desired payee. Following the step 712 is a step 713 where the user is provided with the name of the first payee. If the user responds to the name of the first payee by pressing the "NO" key or by timing out, then control transfers from the step 713 to a step 714 where the user is provided with the name of the second payee. If the user responds to the name of the second payee at the step 714 by pressing the "NO" key or by timing out, control transfers from the step 714 to a step 715 where the user is provided with the name of a third payee (if any). In this way, the user is provided with the names of all of the payees, one at a time, associated with the touch tone button pressed by the user at the step 683 of FIGS. 16A and 16B.

If the user responds to the name of the third payee by pressing the "NO" key or by timing out, the user is provided with the names of the remaining payees, one at a time. If the user responds to the names of all of the payees by pressing the "NO" key or by timing out, control transfers to a step 716 which indicates that the names of the payees will be repeated. If the user presses the "YES" key at the step 716, control transfers back to the step 712 to prompt the user by naming all the payees, one at a time, as described above.

The user can press the "YES" key at the step 713, thus selecting the first payee named at the step 713. When the user presses the "YES" key at the step 713, control transfers from the step 713 to a step 723 where a prompt is provided requesting that the user confirm selection of the first payee. Similarly, if the user presses the "YES" key at the step 714, control transfers from the step 714 to a step 724 where the user is requested to confirm selection of the payee named at the step 714. If the user pressed the "YES" key at the step 715, control transfers to a step 725 where the user is requested to confirm selection of the payee selected at the step 715.

If at the step 723 the user presses the "NO" key and hence does not confirm the selection of the payee selected at the step 713, control is transferred from the step 723 to a step 730 indicating that the choices will be repeated. Following the step 730, control transfers back to the prompt 712 and the payee naming steps 713–715, described above.

If at the step 723 the user confirms selection of the first payee, by pressing the "YES" key, control transfers from the step 723 to a step 731 where the first payee is chosen. Following the step 731 is a step 732 where the user enters the payment amount.

If at the step 724 the user does not confirm selection of the second payee (by pressing the "NO" key at the step 724), then control transfers from the step 724 to a step 733 where a prompt is provided to determine if the user would like to select the first payee (i.e., the payee named at the step 713). If the user presses the "YES" key at the step 733, control transfers from the step 733 to a step 734 where the first payee is chosen. Following the step 734 is the step 732 where the user enters the amount of the payment. Otherwise, if the user presses the "NO" key at the step 733, then control transfers from the step 733 to a step 735 where the user can pay someone else.

If the user presses the "YES" key at the step 724, thus confirming selection of the second payee at the step 714, control transfers from the step 724 to a step 736 where the second payee is chosen. Following the step 736 is the step 732 where the user enters the payment amount.

If at the step 725 the user does not confirm selection of the third payee, by pressing the "NO" key, then control transfers from the step 725 to a step 737 where a prompt is provided to determine if the user selects the second payee for payment. If the user confirms selection of the second payee for payment by pressing the "YES" key at the step 737, control transfers from the step 737 to a step 738 where the second payee is chosen. Following the step 738 is the step 732 where the user enters the payment amount. Otherwise, if the user presses the "NO" key at the step 737, then control transfers from the step 737 to a step 739 where the user pays someone else.

If at the step 725 the user confirms selection of the third payee at the step 715, then control transfers from the step 725 to a step 740 where the third payee is selected. Following the step 740 is the step 732 where the user enters the payment amount.

The methods of selection illustrated herein in connection with the bill payment option is applicable to other systems where it is advantageous to select a subset of options by providing a letter of the alphabet corresponding to the subset.

Even though the invention has been described herein as running on specific hardware (i.e. the ACD 172, the VPS 174, and the host processor 176), it will be understood by one of ordinary skill in the art that the invention can be practiced using equivalent hardware that performs essentially the same functions as the hardware disclosed herein. Similarly, although the exemplary embodiment of the invention shown herein is for a banking system, it will be understood by one of ordinary skill in the art that the invention has applicability to systems other than banking systems.

The invention being thus described, it will be obvious that the same may be varied in many ways. Such variations are not to be regarded as a departure from the spirit and scope of the invention and such modifications are intended to be included within the scope of the following claims.

What is claimed:

1. A method of operating an automated voice response system comprising:

prompting for input data comprised of a user identifier and an identification code;

receiving the input data;

determining whether the input data corresponds to a first host network or a second host network;

coupling the automated voice response system to the first host network or the second host network based on the input data; and providing a plurality of services when the automated voice response system is coupled to a financial institution via the first host network.

2. The method of claim 1 wherein the services include transactions involving money in the financial institution.

3. The method of claim 1 wherein the services include securities assistance.

4. The method of claim 1 wherein the service includes loan assistance.

5. The method of claim 2 wherein the transactions involving the money in the financial institution are further comprised of:

transferring the money within the financial institution; and making payments with the money within the financial institution.

6. The method of claim 5 wherein the making payments is further comprised of:

providing a list of potential payees to receive payments.

7. The method of claim 6 wherein the making payments is further comprised of:

selecting one from the list of potential payees.

8. The method of claim 7 wherein the selecting is further comprised of:

entering one or more signals indicative of at least a first letter of the one from the list of potential payees.

9. The method of claim 8 wherein the selecting is further comprised of:

entering one or more signals indicative of at least a second letter of the one from the list of potential payees.

10. The method of claim 8 wherein:

the first letter is a beginning letter of a name associated with the one from the list of potential payees.

11. The method of claim 2 wherein the services includes credit card assistance.

12. The method of claim 2 wherein the services include customer service.

13. The method of claim 1 wherein the input data is generated by the use of a communications device.

14. The method of claim 13 wherein the communications device is a touch-tone telephone.

15. A method of exchanging first data from an automated voice response system for second data from a user and a telephone comprising:

transmitting a first prompt, as part of the first data, from the automated voice response system to the telephone wherein the first prompt is a request for the user to enter a user identifier;

using the telephone, by the user, to generate the user identifier, as part of the second data;

transmitting the user identifier to the automated voice response system;

receiving the user identifier by the automated voice response system;

transmitting a second prompt, as part of the first data, from the automated voice response system to the telephone wherein the second prompt is a request for the user to enter an identification code;

using the telephone, by the user, to generate the identification code, as part of the second data;

transmitting the identification code to the automated voice response system;

determining if the user should be coupled to a first network or a second network via the automated voice response system and the telephone based on the user identifier and the identification code; and coupling the user to a financial institution via the first network, automated voice response system and the telephone.

16. The method of claim 15 wherein the user is presented with an option of selecting one from a plurality of financial services associated with the financial institution.

17. The method of claim 16 wherein the plurality of financial services includes making transactions with money within the financial institution.

18. The method of claim 16 wherein the plurality of financial services includes making transactions with respect to loans.

19. The method of claim 16 wherein the plurality of financial services includes making transactions with respect to a credit card.

20. The method of claim 16 wherein the plurality of financial services include customer service.

21. The method of claim 17 wherein the transactions relating to money within the financial institution include making payments.

22. The method of claim 21 wherein making payments is further comprised of:

transmitting to the telephone by the automated voice response system a third prompt asking for a letter within a potential payee's name;

receiving a user inputted letter;

providing to the user a list of payees that share that letter with the potential payee; and receiving a signal from the user indicative of one of those payees.

* * * * *